(12) United States Patent
Frost

(10) Patent No.: US 7,389,242 B2
(45) Date of Patent: Jun. 17, 2008

(54) INTERACTIVE PROCESSING OF REAL ESTATE TRANSACTIONS

(75) Inventor: Richard N. Frost, Corona Del Mar, CA (US)

(73) Assignee: RE3W Worldwide Limited, Hamilton (BM)

( * ) Notice: Subject to any disclaimer, the term of this patent is extended or adjusted under 35 U.S.C. 154(b) by 374 days.

(21) Appl. No.: 10/430,829

(22) Filed: May 6, 2003

(65) Prior Publication Data

US 2004/0044696 A1    Mar. 4, 2004

Related U.S. Application Data

(60) Provisional application No. 60/455,222, filed on Mar. 14, 2003, provisional application No. 60/378,563, filed on May 7, 2002.

(51) Int. Cl.
*G06Q 10/00* (2006.01)
(52) U.S. Cl. ......................................................... 705/1
(58) Field of Classification Search ..................... 705/1
See application file for complete search history.

(56) References Cited

U.S. PATENT DOCUMENTS

| | | | |
|---|---|---|---|
| 5,032,989 A | 7/1991 | Tornetta | |
| 5,559,707 A | 9/1996 | DeLorme et al. | |
| 5,794,216 A | 8/1998 | Brown | |
| 6,282,489 B1 | 8/2001 | Bellesfield et al. | |
| 6,321,202 B1 | 11/2001 | Raveis, Jr. | |
| 6,385,541 B1 | 5/2002 | Blumberg et al. | |
| 6,397,208 B1 | 5/2002 | Lee | |
| 6,470,267 B1 | 10/2002 | Nozaki | |
| 6,477,526 B2 | 11/2002 | Hayashi et al. | |
| 6,480,785 B1 | 11/2002 | Joerg et al. | |
| 6,519,618 B1 | 2/2003 | Snyder | |
| 6,594,633 B1 | 7/2003 | Broerman | |
| 6,597,983 B2 * | 7/2003 | Hancock ..................... 701/200 |
| 6,633,875 B2 | 10/2003 | Brady | |
| 6,636,803 B1 | 10/2003 | Hartz, Jr. et al. | |
| 6,684,196 B1 | 1/2004 | Mini et al. | |
| 6,711,554 B1 | 3/2004 | Salzmann et al. | |
| 2001/0034607 A1 | 10/2001 | Perschbacher, III et al. | |
| 2002/0052814 A1 | 5/2002 | Ketterer | |
| 2002/0065739 A1 | 5/2002 | Florance et al. | |
| 2003/0078897 A1 | 4/2003 | Florance et al. | |

FOREIGN PATENT DOCUMENTS

WO    PCT/US03/14244    5/2003

OTHER PUBLICATIONS

Information on RealtorWorkstation, 2000, MRIS.*

(Continued)

*Primary Examiner*—Naresh Vig
(74) *Attorney, Agent, or Firm*—Knobbe Martens Olson & Bear, LLP

(57) ABSTRACT

The systems and methods dislcosed facilitate real estate transactions. The systems and methods preferably allow a participant in a real estate transaction process to create, access, and modify the content of property files associated with parcels of lands. The systems and methods preferably allow a user to administer access rights to access and modify the content of portions of the property files. The systems and methods preferably allow various participants in the real estate transaction process to integrate content into one or more portions of a property file.

7 Claims, 29 Drawing Sheets

OTHER PUBLICATIONS

A Sample Pl/SQL Program, Jan. 16, 2002, Oracle Corporation, printed through www.archive.org.*

Information on Metropolitan Regional Information Systems, Inc., Dec. 6, 1998, printed through www.archive.org.*

Information on RealtorWorkstation, 2000, Metropolitan Regional Information Systems, Inc. (MRIS).*

Maryland Department of Assessment And Taxation, Jan. 5, 2002, printed through www.archive.org.*

Yellow Pages.com.au, dated Nov. 17, 2003.

Information on Metropolitan Regional Information Systems, Inc., 1999-2000.

Information on Realtor.com, 1997-2000.

Information on Property Exchange, LLC 2001-2002.

Information on iProperty.com, Inc., 1999-2002.

Information on Yardi Systems, 1999-2001.

* cited by examiner

1110 — RETRIEVE GLOBAL POSITION DATA

1115 — DETERMINE PROPERTY ASSOCIATED WITH GLOBAL POSITION DATA

1120 — ACCESS DATABASE INFORMATION FOR PROPERTY

1125 — ADD DATABASE INFORMATION TO PROPERTY FILE

1130 — SAVE PROPERTY FILE

Improvements:
Year Built**                    1969
Number of Units**               N/A
Number of Buildings on Parcel** 1
Building Square Footage**       N/A
Actual Building Square Footage.

Tax Information:
Assessed Value of Land**         $189,039.00
Assessed Value of Improvements** $82,238.00
Total Assessed Value**           $271,277.00
Tax Amount**                     $275,754.00
Tax Year**                       2000

Sale and Loan Information:
Last Sale Date**                 N/A
Document No. Of Last Sale**      N/A
Last Sale Amount**               $0.00
Number of TAPN's Associated      N/A
w/Sale.**:
Lender Name**:                   N/A
Amount of 1st Loan**             $0.00
Amount of 2nd Loan**             $0.00

INTERACTIVE PROCESSING OF REAL ESTATE TRANSACTIONS

REFERENCE TO RELATED APPLICATIONS

The present application claims priority benefit under 35 U.S.C. § 119(e) from U.S. Provisional Application No. 60/378,563, filed May 7, 2002, entitled "INTERACTIVE PROCESSING OF REAL ESTATE TRANSACTIONS." and from U.S. Provisional Application No. 60/455,222, filed Mar. 14, 2003, entitled "INTERACTIVE PROCESSING OF REAL ESTATE TRANSACTIONS." The present application incorporates disclosures of the foregoing provisional applications herein by reference.

FIELD OF THE INVENTION

The present invention relates to the field of data management and transaction management. More specifically, the invention relates to data management and transaction management in real estate transactions.

BACKGROUND OF THE INVENTION

Traditionally, the origination, negotiation, and conclusion of real estate transactions involved many industry participants, including but not limited to a developer, an owner, a tenant, a broker, and sector experts (or "service providers") that assist, give expert advice, give expert opinion, or the like. Examples of service providers include but are not limited to insurance companies, financial institutions (e.g., lenders or the like), escrow companies, title companies, construction companies, advertising companies, architects, property inspectors, appraisers, attorneys, property managers, aerial photographers, property photographers, governmental entities (e.g., federal, state, county, local, city, town, or the like), governmental agencies, or the like.

Typically, each of these many participants would track transaction-related information in ways making the information accessible only through time-consuming coordination. Much of the information was accessible only with physical possession of a participant's records. For example, a real estate broker might keep a tangible file folder for a listed parcel of property, and an aerial photographer might keep an informal record of properties in labeled boxes of photographs. Accordingly, to use the information that another participant possessed, a requesting participant had to contact the other participant and make arrangements to obtain physical possession of the records for reading or photocopying. Additionally, other participants tracked information using internal computer systems solely useful for tracking information relevant to the participant. Accordingly, to use the information that another participant possessed, a requesting participant had to contact the other participant and make arrangements to obtain a printout of the records. Yet, the printouts were customized for the needs of the computer system owner and not for the needs of the requesting participant.

After obtaining a computer system printout or photocopies from a file, the requesting participant would spend further effort synthesizing the information into a useful format. For example, the photocopies and computer printouts often included data irrelevant to the requesting participant's purposes. Further, because the requesting participant often had its own particular forms and/or file system, the requesting participant would have to manually enter the relevant information from the computer system printout or the photocopies from a file. This manual entry was slow and costly. Further, as real estate transactions traditionally involved many participants, the participants would each manually enter much of the same information. This inefficient process added time and labor costs to real estate transactions.

Because gathering and synthesizing transaction-related information was so slow, participants were relectant to relinquish control of their valuable work product. Accordingly, transaction-related information was typically kept in tangible file folders, giving the participant having physical possession of the file folders control of the information. Alternatively, the participant would track transaction-related information using internal computer systems. However, although protecting the information to a certain extent, the file folder systems and the internal computer systems still required time-consuming coordination, as described above. Also, because the person possessing the file folders controlled the information, persons could disrupt a participant's business by leaving a participant's company and taking file folders with them. For example, when leaving a broker, agents might take file folders.

With each participant being a fragmented component of the real estate transaction process, it was virtually impossible to determine what information each participant needed, what information each participant lacked, and what tasks needed to be done. Accordingly, much time was lost in ensuring that the transaction was actively progressing.

Embodiments of the present invention seek to overcome some or all of these and other problems.

SUMMARY OF THE INVENTION

Embodiments of the present invention comprise various inventive features for creating, and controlling user access to, property files that include information (such as pictures, descriptive text, reports, etc.) about specific parcels of real property. These inventive features may be implemented individually or in combination within a multi-user server application or system. For example, in a preferred embodiment, the various inventive features are embodied within a web site system that may be accessed by various types of users and business entities.

One aspect of an embodiment of the invention involves a process through which one or more providers integrate products (e.g., photographs, documents, property-related data, etc.) into a property file for a parcel of land. In a preferred embodiment, a user sends a request for supplemental information to be added to a property file. In response, information from the property file is sent to a provider. The provider generates and sends supplemental information to be added to the property file. Preferably, the supplemental information is automatically associated and integrated with the property file. A user can thus conveniently add content to a property file from one or more providers.

Another feature of an embodiment of the invention involves a process through which access rights to one or more property files are administered. In a preferred embodiment, a user (e.g., an access rights administrator) creates sets of access rights. The access rights are preferably customizable to different sets of property files, different portions of property files, or both. A user can thus allow different participants access to view and modify the content of a property file, according to the varied responsibilities of the participants.

Another feature of an embodiment of the invention involves a process through which the GPS coordinates of a parcel of land may be conveniently used to initiate generation of a property file for that parcel. In a preferred embodiment, a user having a GPS receiver obtains the GPS coordinates of the parcel of land during a visit thereto, and supplies these GPS coordinates to a server system. The server system responds by identifying the corresponding parcel of land (e.g., by tax ID number), retrieving information about the parcel from one or more sources, and incorporating this information into a property file that may thereafter be viewed by the user. In one embodiment, to obtain the GPS coordinates, a user selects a portion of a displayed photographic image (e.g., a satellite photo, aerial photo, etc.) having associated GPS coordinates. A user can thus initiate generation of the property file even if the user does not know the tax ID or the property address of the parcel.

Another feature of an embodiment of the invention involves a process through which one or more street names may be conveniently used to initiate generation of a property file for a parcel of land. In a preferred embodiment, a user selects two or more street names to locate parcel maps, which preferably display parcel IDs. In response, a set of one or more parcel maps associated with the street names are presented. The user may thus review the parcel maps to determine the parcel ID corresponding to parcel of land and initiate the generation of a property file. A user can thus initiate generation of the property file even if the user does not know the tax ID or the property address of the parcel.

Another feature of an embodiment of the invention involves a process through which a set of one or more properties may be identified according to a selected side of a street. In a preferred embodiment, the user selects a side of a street to locate one or more properties. In response, a list of properties corresponding to the selected side of the street is displayed. A user can thus conveniently view a side of a street where desired (e.g., one side of a street might be coastal properties with an ocean view).

Another feature of an embodiment of the invention involves a process through which access rights to one or more property files are determined according to a relationship among a plurality of participants. In a preferred embodiment, a plurality of participants create a relationship defining the post-relationship access rights to a set of one or more property files. Preferably, in response to the dissolution of the relationship, the system automatically grants or denies, to the participants, access to copies of the property files in accordance with the post-relationship access rights. Participants can thus conveniently define which of the participants will have access to property files (e.g., those created during the relationship) prior to the participants deciding to end the relationship.

Neither this summary nor the following detailed description purports to define the invention. The invention is defined only by the claims.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention. Throughout the drawings, reference numbers are re-used to indicate correspondence between referenced elements. In addition, the digits other than the rightmost two digits of each reference number indicates the figure in which the element first appears.

FIG. 11 illustrates a block diagram of a process for searching properties using a global positioning receiver, in accordance with an embodiment of the invention.

FIG. 13A illustrates a description tab for managing certain content within a property file, in accordance with an embodiment of the invention.

FIG. 13B illustrates a description tab for managing certain content within a property file, in accordance with an embodiment of the invention.

DETAILED DESCRIPTION OF THE PREFERRED EMBODIMENT

To facilitate a complete understanding of the invention, the remainder of the detailed description describes various embodiments and features of the invention with reference to the drawings, wherein like reference numbers are referenced with like numerals throughout.

Figure 1:
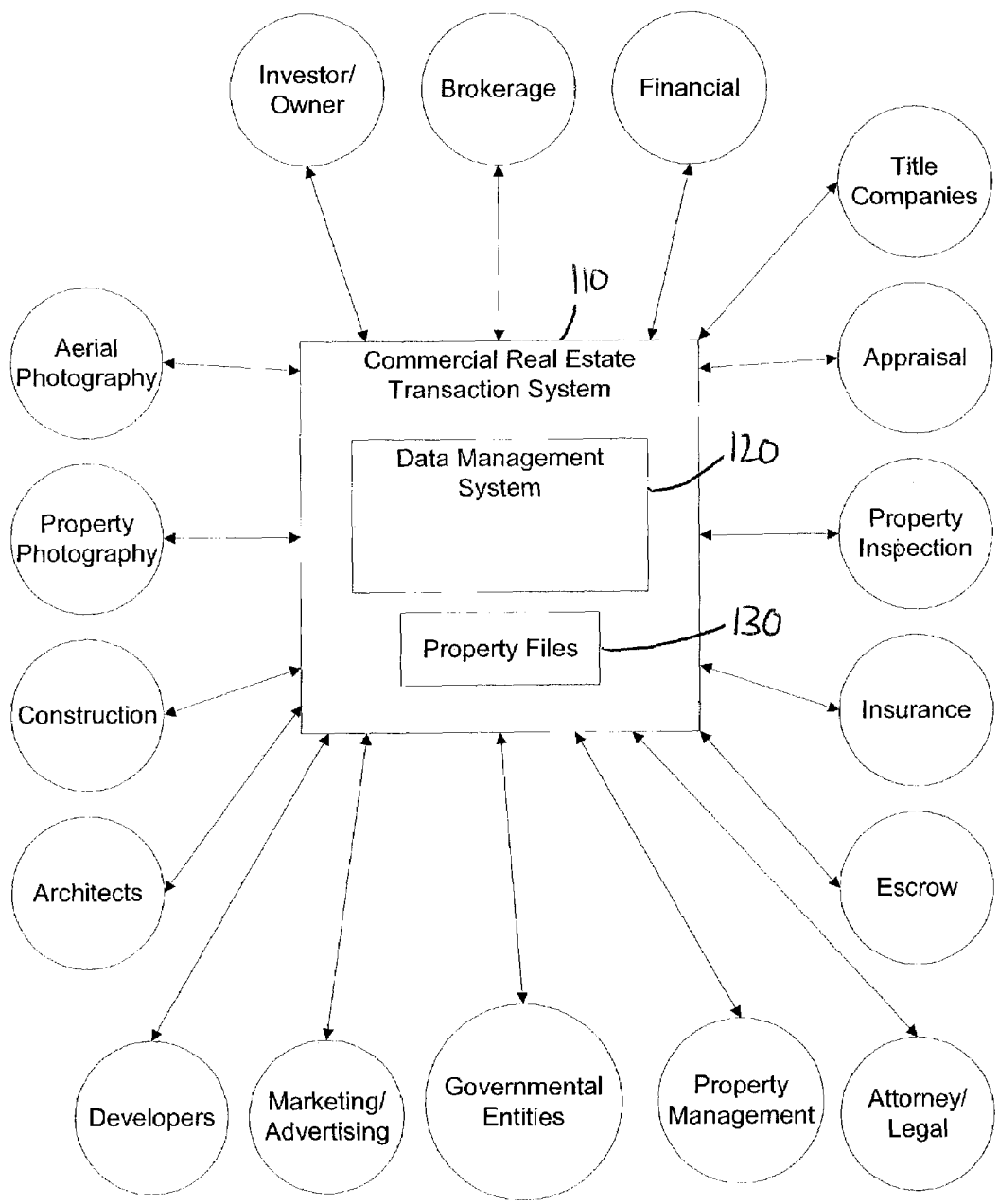
FIG. 1 illustrates a block diagram of a commercial real estate transaction system in accordance with an embodiment of the invention.

FIG. 1 illustrates a commercial real estate transaction system 110 according to one embodiment of the invention. The commercial real estate transaction system 110 includes a data management system 120 and one or more property files 130. Each property file 130 preferably corresponds to, and includes information about, a particular parcel of real property. As described below, a given property file may contain content (e.g., data, documents, graphics, photographs, or the like) generated by a number of different participants in a real estate transaction. One or more real estate transaction participants use the commercial real estate transaction system 110 to facilitate activities related to a real estate transaction.

Figure 2:
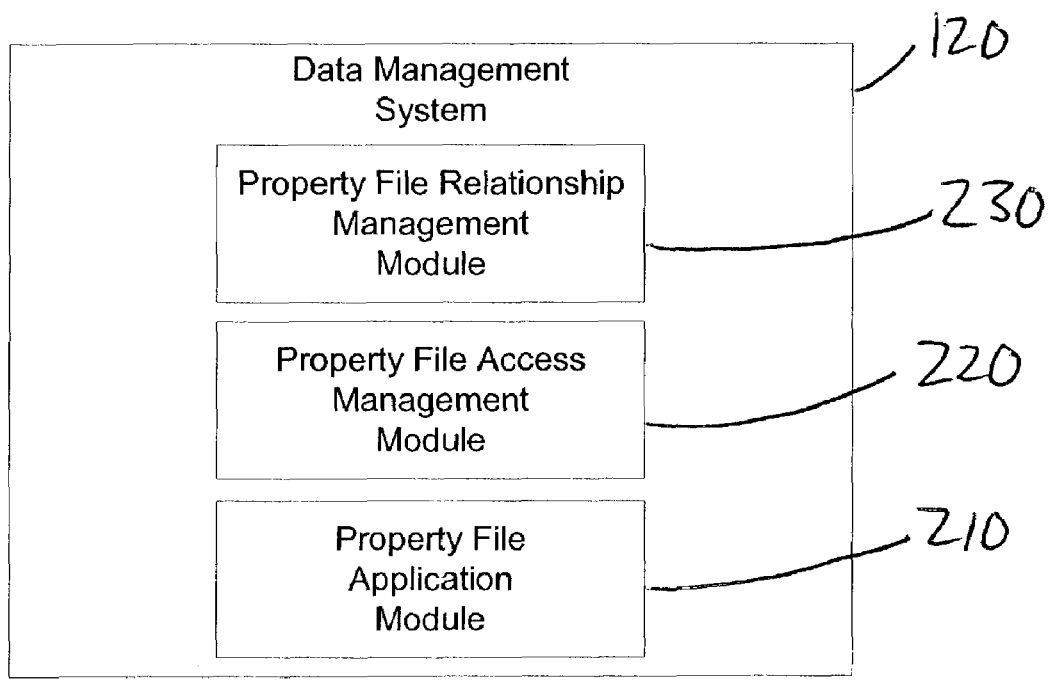
FIG. 2 illustrates a block diagram of a data management system of the commercial real estate transaction system illustrated in FIG. 1, in accordance with an embodiment of the invention.

As shown in FIG. 2, a participant preferably uses a property file application module 210 to create a property file 130 for a parcel of property. The property file application module is preferably a multi-user, web-based server application. To accomplish a transaction-related task, a participant also uses the property file application module 210 to access and modify the content of existing property files 130. Operations that may be performed include viewing, adding, deleting, editing, importing, exporting content of the property files 130. The various embodiments described herein for creating property files 130 and using the content of the property files 130 are preferably embodied in the property file application module 210. Some embodiments described in further detail below include aspects that rapidly locate and add content to the property file 130.

A participant can advantageously use a property file access module 220 to administer access rights for using the property file 130 to one or more other participants. The access rights include but are not limited to viewing, adding, deleting, editing, importing, exporting or the like. A given user may be given different access rights to different property files 130. Further, the participant can advantageously use the property file access module 220 to create a "view" comprising some or all of the portions of a property file 130. Accordingly, a participant may use the property file access module 220 to advantageously grant another participant access rights for completing a transaction-related task, but still protect the integrity of some or all of its work product, protect the secrecy of some or all of its work product, or both.

The participant can advantageously use the property file access module 220 to create a hierarchy of access rights for using a plurality of property files 130. The parcipant may administer the hierarchy of access rights for one or more other participants. Some embodiments described in further detail below allow a participant to use a set of property files within a hierarchy. Accordingly, a participant having more responsibility may advantageously be granted rights to use more files and/or may be granted greater access rights to specific files. Conversely, a participant having less responsibility may advantageously be granted rights to use fewer files and/or may be granted a lower level of access rights (e.g., view only) to specific files. The various embodiments described herein for administering access rights to property files 130 are preferably embodied in the property file access module 220.

Also, a participant can advantageously use a property file relationship management module 230 for creating a relationship among two or more participants. Upon dissolution of the relationship, the relationship preferably determines the post-relationship access rights to property files that were created within the relationship. Accordingly, prior to entering a relationship, two or more participants may advantageously decide how to resolve disputes relating to the work product generated within the relationship. The various embodiments described herein for creating and managing relationships are preferably embodied in the property file relationship management module 230.

Unless indicated otherwise, it may be assumed that the process steps described herein are implemented within software modules (programs) that are executed by one or more general purpose computers. The software modules may be stored on or within any suitable computer-readable medium.

It should be understood that the various steps may alternatively be implemented in-whole or in-part within specially designed hardware.

Account Types

Figure 3A:
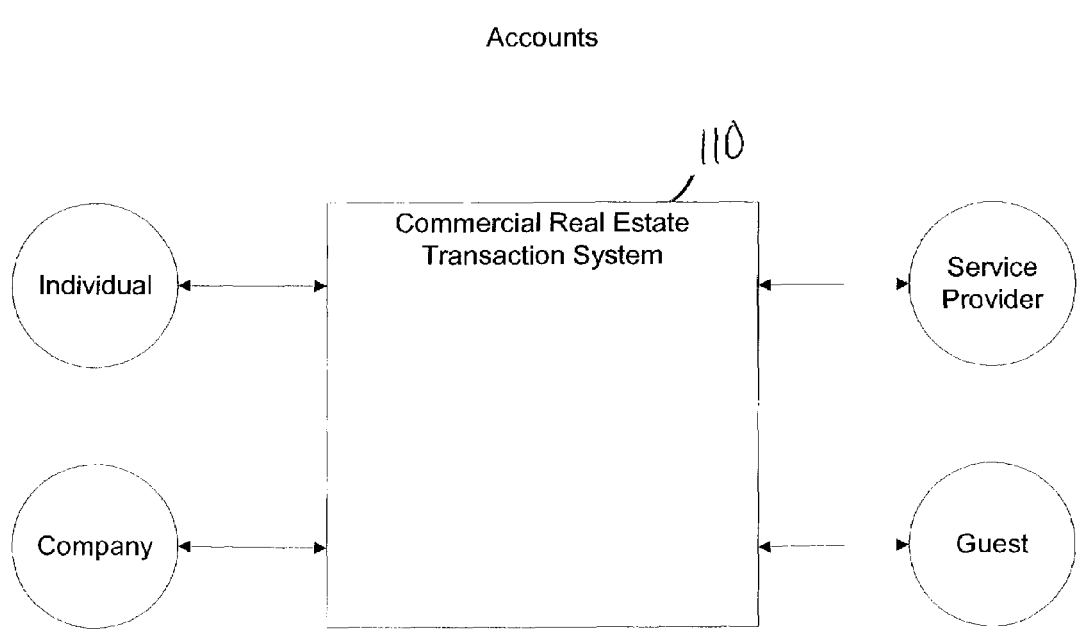
FIG. 3A illustrates a block diagram of a set of user accounts for accessing the commercial real estate transaction system illustrated in FIG. 1, in accordance with an embodiment of the invention.

As illustrated in FIG. 3A, various types of accounts access the commercial real estate transaction system 110, according to an embodiment of the invention. The account types preferably include but are not limited to an individual member type, a company member type, a group member type, a guest member type, and a service provider type. Of course, other account types could be used.

Individual Member

In one embodiment, an individual member uses the property file application module 210 to create and use one or more property files 130. The individual member can advantageously use the property file access module 220 to grant access rights to others for using the individual's property files 130, to create a view using some or all of the portions of individual's property files 130, or both. Thus, the individual member "possesses" a property file 130 because the individual member has the administrative control of the access rights to the property files 130 it created.

Company Member

In one embodiment, a company member comprises one or more subaccount members operating under one company member account. The property file application module 210 is preferably used to create and use one or more property files 130 for the company member account.

The property file access module 220 can advantageously be used to create a hierarchy of access rights for creating and using a set of property files 130 under the company member account. The property file access module 220 is preferably used to grant access rights for using the property file 130 within the hierarchy of access rights. In one embodiment, the property file access module 220 is used to create a view comprising some or all of the portions of a set of property files 130 under the company member account. Thus, the company member "has possession of," or has the administrative control of the access rights to, the property files 130 created under the company member account.

Group Member

Figure 3B:
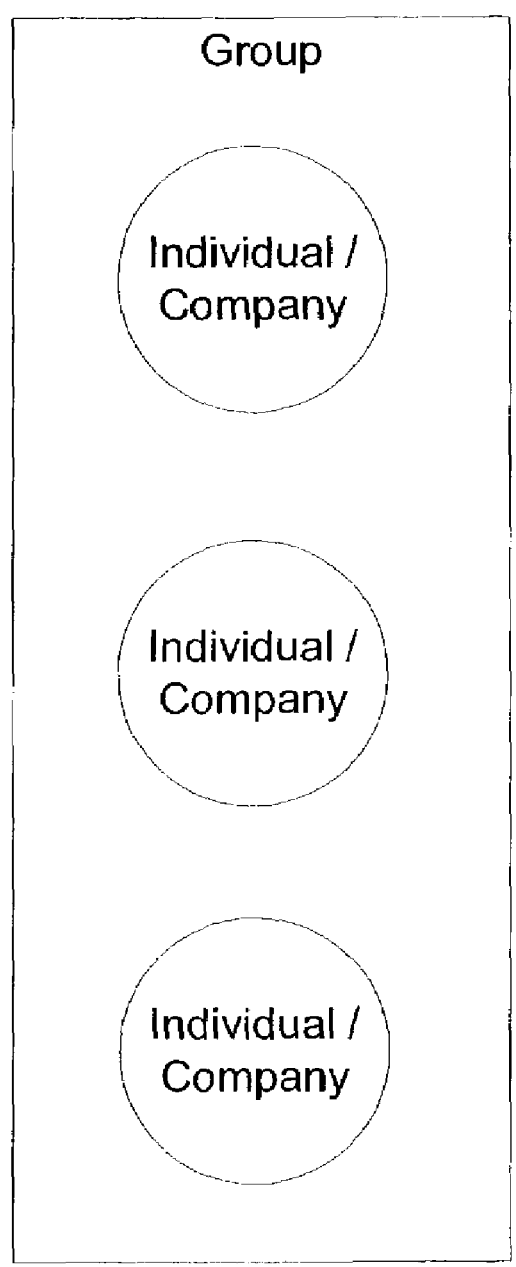
FIG. 3B illustrates a group user account for accessing the commercial real estate transction system illustrated in FIG. 1, in accordance with an embodiment of the invention.

FIG. 3B illustrates a group member account comprising two or more of individual accounts, company accounts, or a suitable combination thereof, in accordance with an embodiment of the invention.

In one embodiment, a company member account, a company member subaccount, an individual member account, or any suitable combination thereof use the commercial real estate transaction system 110 to create one or more property files by logging in under a group member account. The accounts that comprise the group member account preferably may use the one or more property files created under the group account.

Figure 21A:
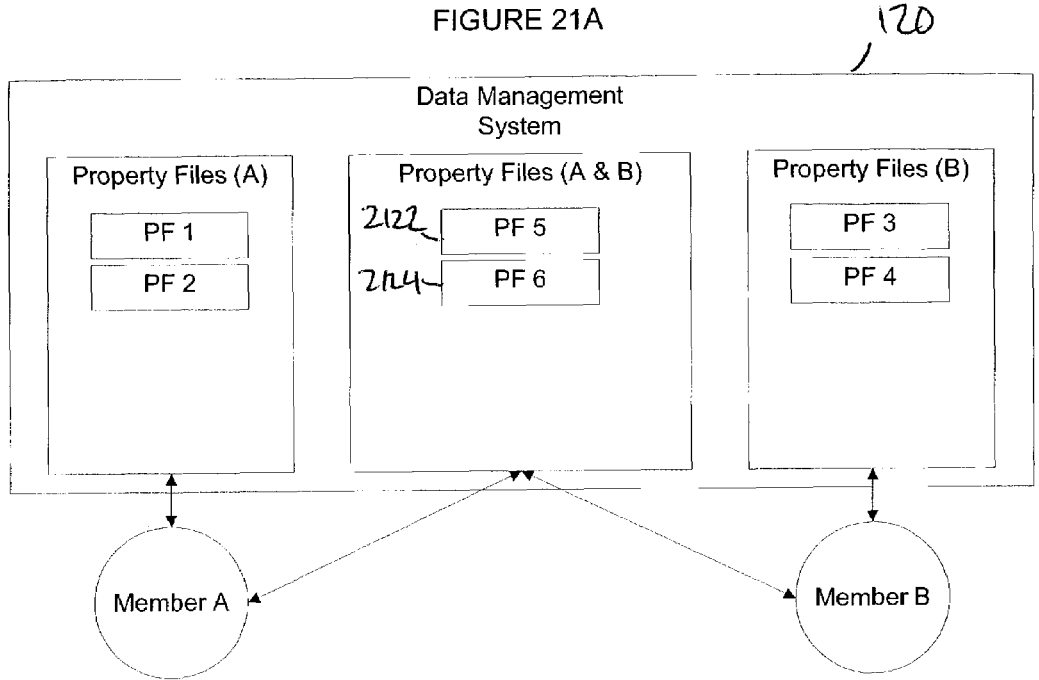
FIG. 21A illustrates a block diagram of a data management system for managing relationships among two or more members, in accordance with an embodiment of the invention.
Figure 21B:
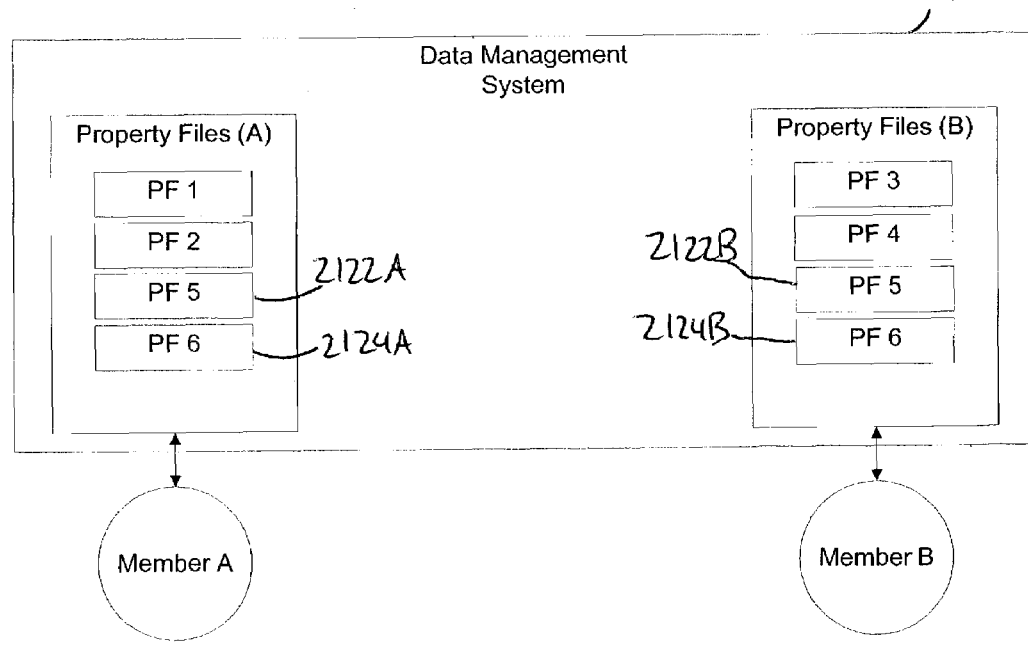
FIG. 21B illustrates a block diagram of a data management system for managing relationships among two or more members, in accordance with an embodiment of the invention.
Figure 21C:
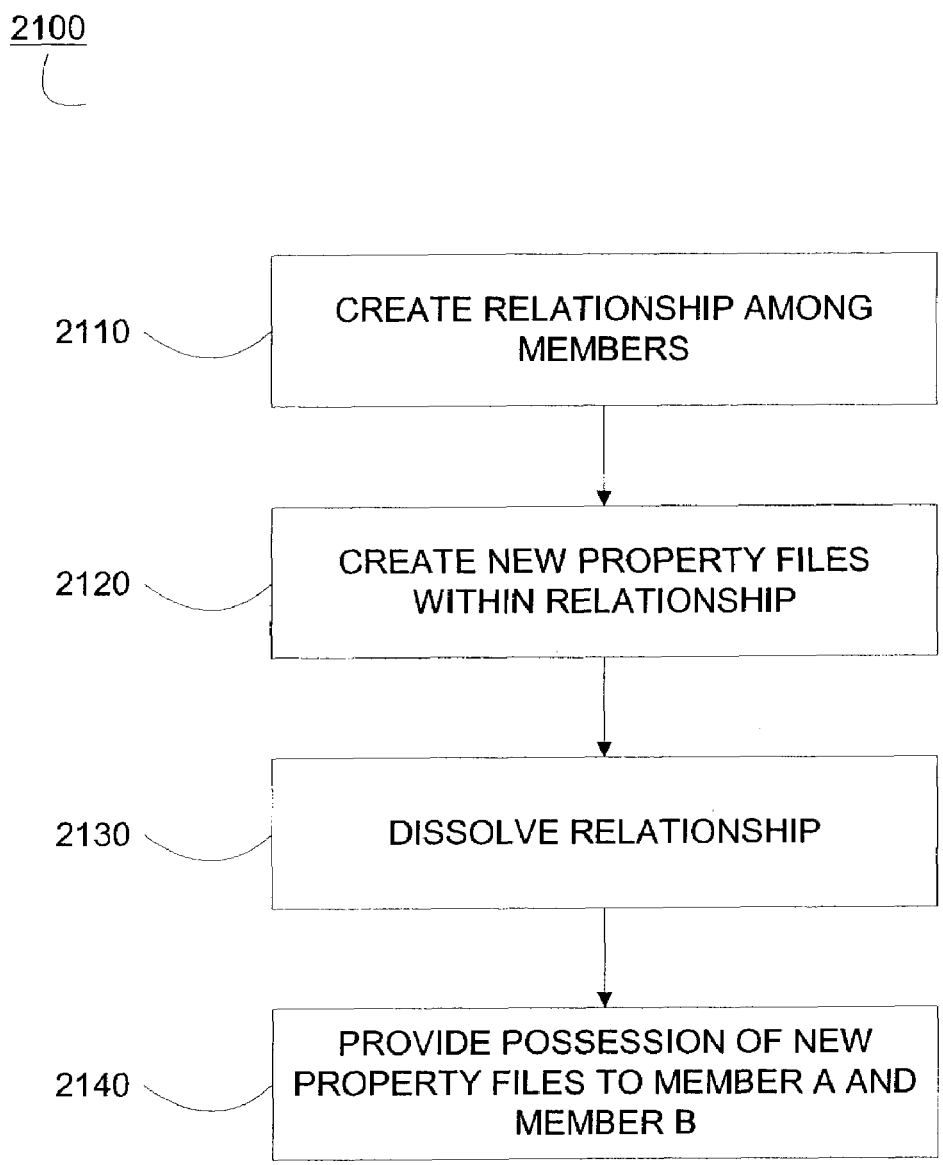
FIG. 21C illustrates a block diagram of a data management process preferably used with the data management system illustrated in FIG. 21A and FIG. 21B, in accordance with an embodiment of the invention.
Figure 22A:
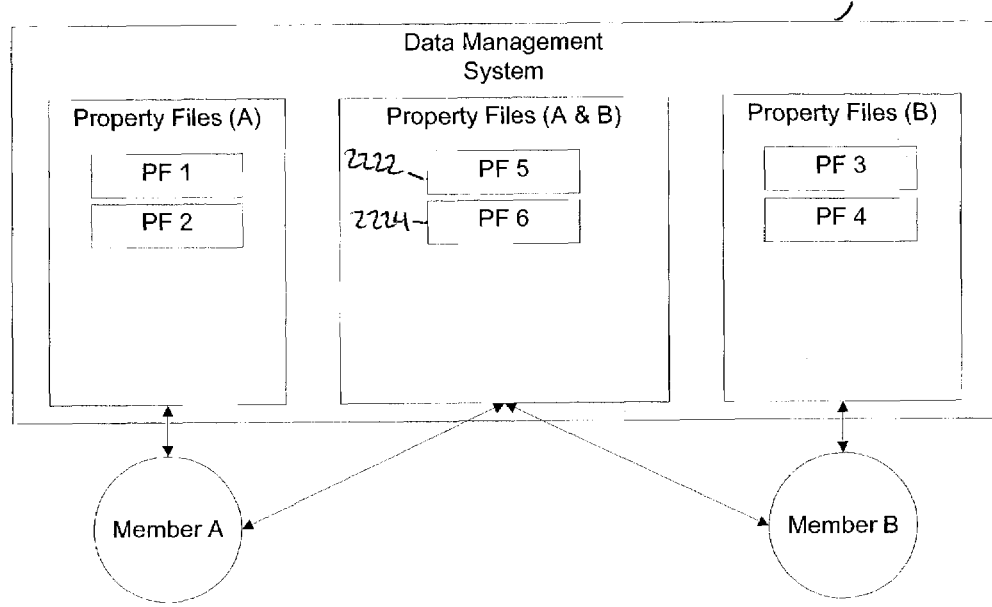
FIG. 22A illustrates a block diagram of a data management system for managing relationships among two or more members, in accordance with an embodiment of the invention.
Figure 22B:
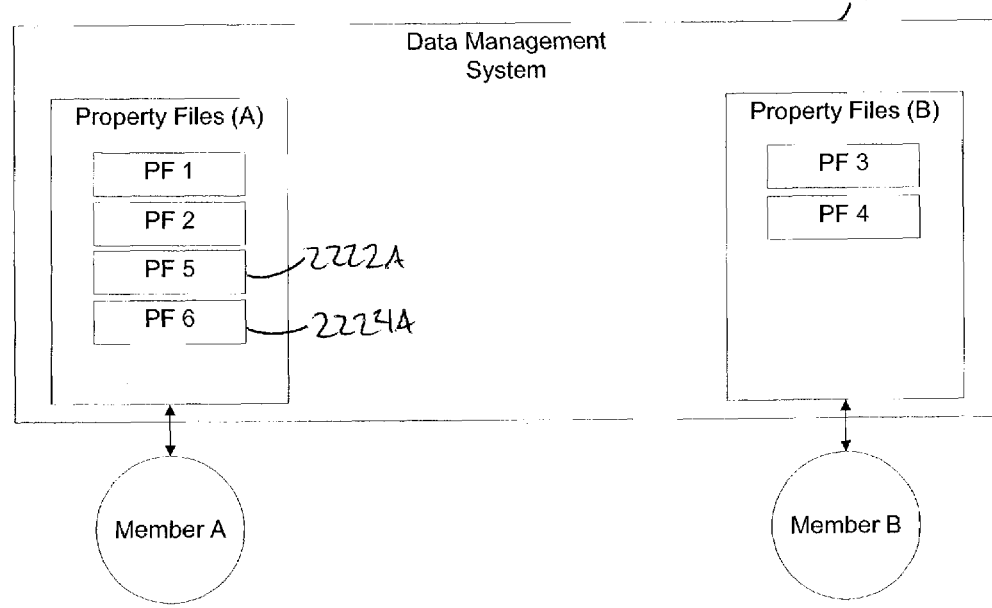
FIG. 22B illustrates a block diagram of a data management system for managing relationships among two or more members, in accordance with an embodiment of the invention.
Figure 22C:
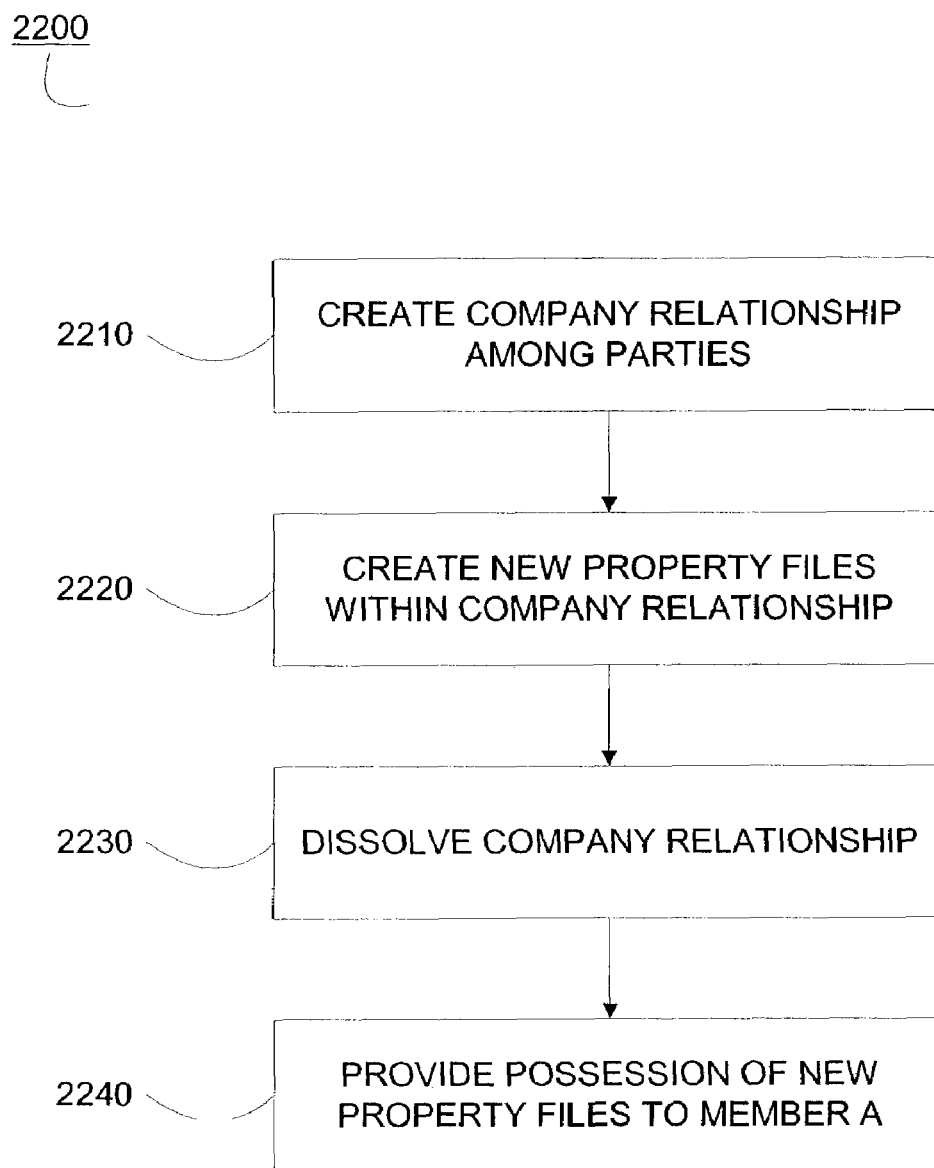
FIG. 22C illustrates a block diagram of a data management process preferably used with the data management system illustrated in FIG. 22A and FIG. 22B, in accordance with an embodiment of the invention.

In one embodiment, when the group account is dissolved, one or more of the accounts retain access rights to copies of the one or more property files created under the group account in a manner substantially similar to that described herein with reference to FIGS. 21A, 21B, 21C; FIGS. 22A, 22B, 22C, or any suitable combination thereof.

Guest Member

In one embodiment, a guest member does not create property files 130. Rather, the guest member can advantageously use a property file, after a company member or an individual member creates a property file 130 and grants the guest member access rights to the property file 130. The creating member may advantageously use the property file access module 220 to create a view using some or all of the portions of one or more of the creating member's property files 130. In one embodiment, the guest may access services provided by one or more service provider accounts.

Service Provider

In one embodiment, a service provider with a service provider account preferably does not create property files 130. Rather, the service provider offers goods, services, or both to the member using a property file 130. The service provider with a service provider account preferably uses a property file, after a company member or an individual member creates a property file 130 and grants the guest member access rights to the property file 130. The creating member may advantageously use the property file access module 220 to create a view using some or all of the portions of one or more of the creating member's property files 130. As described in certain embodiments below, the results of the goods, services or both may advantageously be added to the content of the property file 130.

In one embodiment, the service provider with a service provider account offers goods, services, or both to guests. The guests can advantageously receive the results of the goods, services, or both via any suitable method, including but not limited to downloading, email, or the like. For example only and not to limit the scope of the invention, a guest might desire to order one or more aerial photographs from a service provider (e.g., a photographer).

In some instances, a service provider with a service provider account may wish to create property files 130 for its own purposes. For example, although a broker could offer services to members having property files 130, the broker may wish to create property files 130 for tracking prospective clients. Accordingly, in addition to a service provider account, the broker can advantageously create property files 130 by opening an individual account, a company account, or both. In another embodiment, a service provider account can create property files 130.

Property File Access Management

In some embodiments of invention, a user uses the property file access module 220 to administer access rights to property files 130. The term "access rights" is a broad term, and is used in its ordinary sense, and further includes without limitation rights to view, add, delete, edit, import, export, upload, and download files (e.g., a property file) or some or all of the content of files. The user uses the property file access module 220 via one or more suitable accounts, including but not limited to a company member account, a company member sub-account, an individual account, or the like.

Access Rights Hierarchy

A company member account preferably comprises a company administrator account for administrating to property files 130 created under the company member account. The company administrator account preferably can create a tree hierarchy that defines the set of property files 130 that a user can view.

Figure 3C:
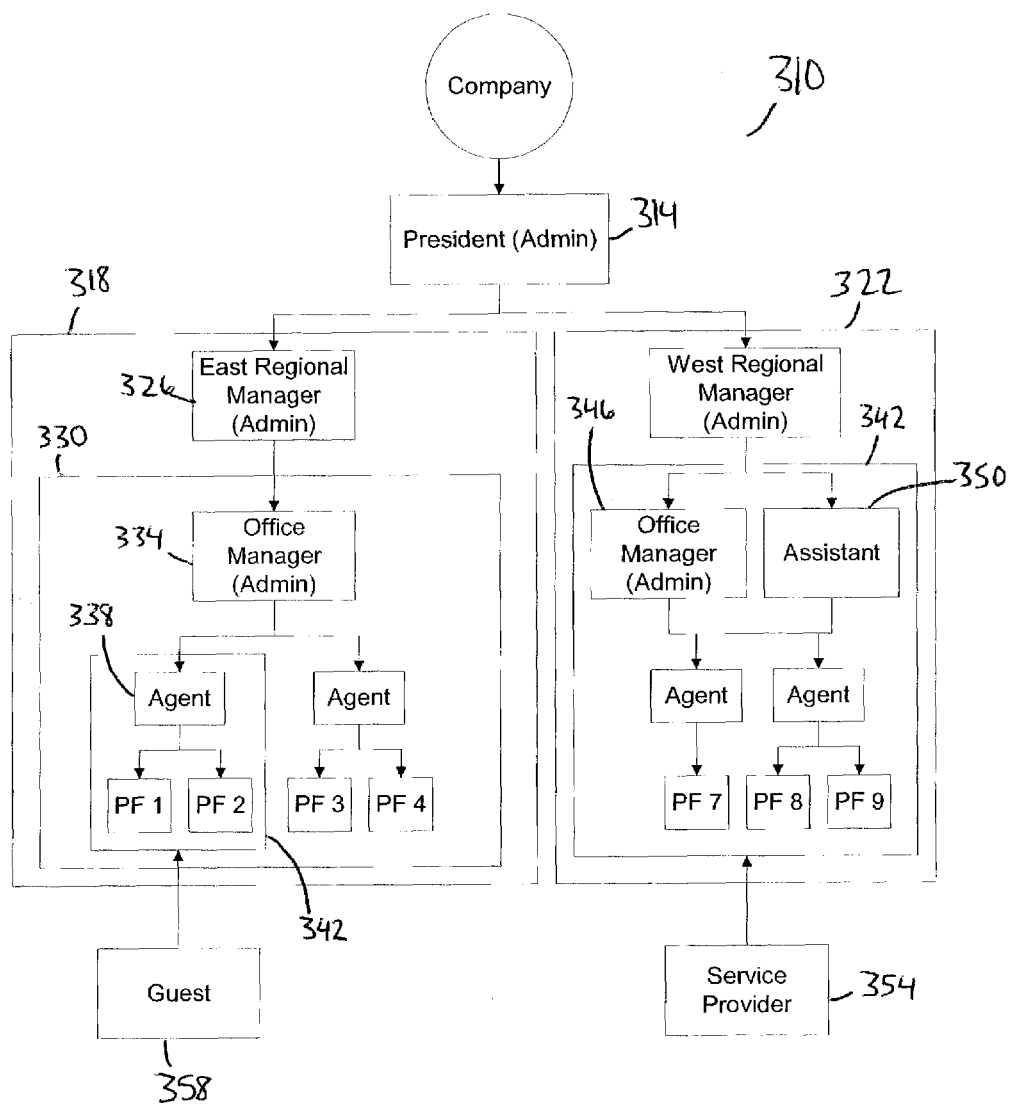
FIG. 3C illustrates a block diagram of a tree hierarchy for administering user access to the commercial real estate transction system illustrated in FIG. 1, in accordance with an embodiment of the invention.

FIG. 3C illustrates a hierarchy 310 according to one embodiment of the invention for an illustrated company. Because a president 314 has company-wide responsibility, the hierarchy 310 is configured that the president 314 can use property files 130 created within each sub-tree of the hierarchy 310 (e.g., subtree 318, subtree 322). Because a regional manager 326 has region-based responsibility, the hierarchy 310 is configured that the regional manager 326 can use property files 130 within a region sub-tree (e.g., sub-tree 318). Because an office manager 334 has office-wide responsibility, the hierarchy 310 is configured that the office manager 334 can use property files 130 within a office sub-tree (e.g., sub-tree 330). In a situation wherein the region sub-tree 318 comprises two or more office sub-trees, the hierarchy 310 is configured that the regional manager can use the property files 130 within the two or more office sub-trees. The hierarchy 310 is configured that an agent 338 can use one or more property files 130 within an agent sub-tree 342. In another situation, the hierarchy 310 is configured that the agent 338 can use one or more property files 130 within the office sub-tree 330. Thus, the hierarchy 310 may advantageously be used to create a tree hierarchy defining the property files 130 that one or more user accounts may access.

The company administrator account preferably can create one or more roles for use within some or all portions of a tree hierarchy. The roles preferably comprise a set of rights to use (e.g., view, add, delete, edit, import, export or the like) the content of the property files 130 within a specified tree or sub-tree.

In one embodiment, the company administrator account creates one or more "views" comprising some or all of the content of a property file 130. Roles may comprise one or more sets of rights associated with one or more views. A view may optionally comprise a set of one or more tabs, portions of tabs, or both in a property file 130 that has tabs.

For example only and not to limit the scope of the invention, the hierarchy 310 comprises an office sub-tree 342. The company administrator account advantageously creates an "office manager" role having rights to view, add, delete, edit, import, export content from property files 130. The company administrator account advantageously creates a company sub-account for an office manager 346. The company administrator account advantageously associates the sub-account for the office manager 346 with the office manager role and with the office sub-tree 342. Accordingly, the office manager 345 may view, add, delete, edit, import, export content from property files 130 within office sub-tree 342.

For example only and not to limit the scope of the invention, the company administrator account advantageously creates an "assistant" role having rights to view content from property files 130. The company administrator account advantageously creates a company sub-account for an assistant 350 to the office manager 346. The company administrator account advantageously associates the sub-account for the assistant 350 with the assistant role and with the office sub-tree 342. Accordingly, the assistant 350 may view content from property files 130 within the office sub-tree 342.

For example only and not to limit the scope of the invention, the company administrator account advantageously creates an "appraiser" role. The company administrator account gives the appraiser role rights to view suitable portions of a property file 130 (e.g., property description, location, exterior photographs, interior photographs, or the like). The company administrator account gives the appraiser role rights to upload an appraisal into a portion of the property file 130. In one embodiment, an appraiser 354 has a service provider account. The company administrator account advantageously associates the service provider account for the appraiser 354 with the appraiser role and with the office subtree 342. Accordingly, the appraiser 354 may view the suitable content from property files 130 within the office sub-tree 342 and upload appraisals to the property files 130.

For example only and not to limit the scope of the invention, the company administrator account advantageously creates an "client" role. The company administrator account gives the client role rights to view limited portions of a property file 130 (e.g., exterior photographs, interior photographs, or the like). In one embodiment, a client 358 has guest account. The company administrator account advantageously associates the guest account for the client 358 with the client role and with the agent sub-tree 342. Accordingly, the client 358 may view the suitable content from property files 130 within the agent sub-tree 342. In the situation where a client is motivated to purchase a property after viewing the suitable content from property files 130 within the agent sub-tree 342, the client and agent may sign a representation contract or the like.

In one embodiment, the company administrator account creates an administrator roles that have administrative rights to create roles, manage roles, create views, manage views, create sub-accounts, manage sub-accounts, or any suitable combination thereof for a set of property files 130. Accordingly, in one situation, the company administrator account advantageously associates the sub-account for the office manager 346 with the office manager role for the office sub-tree 342 and with administrator role for the office sub-tree 342. Accordingly, the office manager 346 may act as an administrator for the office sub-tree 342. A sub-account may have any suitable number of roles associated with any suitable number of property files 130.

In one embodiment, company administrator account comprises a company sub-account having an associated "company administrator" role, which has administrative rights to create roles, manage roles, create views, manage views, create sub-accounts, manage sub-accounts, or any suitable combination thereof for the property files 130 of the company. One or more sub-accounts are preferably associated with the company administrator role. At creation of the company member account, the company member account may optionally be assigned the company administrator role.

The company member account preferably retains control of the property files 130 created under the company member account. For example only and not to limit the scope of the invention, the company administrator account creates a sub-account for an employee, who subsequently creates a set of property files 130. However, because of business reasons, the company must layoff the employee, and the company administrator account deletes the sub-account for the employee. The employee no longer has access to the property files 130 that the employee created; however, the company account still does. Thus, the company administrator account can advantageously grant access access rights to the property files 130 to a second employee.

Although FIG. 3C illustrates the hierarchy 310, any suitable structure other than a tree hierarchy may be used to administer access rights, sub-accounts, views, or the like. In one embodiment, property files 130 are associated with a property file group, as described with reference to FIG. 7. Access rights, sub-accounts, views, or the like may be administered with reference to a property file group in a manner substantialy similar to that described with reference to FIG. 3C.

Further, although FIG. 3C illustrates the hierarchy 310 in the context of a company member, in one embodiment, an individual member may administer access rights, views, or the like to the individual member's property files 130, or subsets of the individual member's property files 130, in a manner substantially similar to that described with reference to FIG. 3C.

In one embodiment, an account (e.g., an individual member, a company member, a company sub-account, a guest member, a service provider) may be associated with a plurality of roles for a plurality of sets of property files 130. In one embodiment, the account has similar roles, different roles, or both among the plurality of sets of property files 130, which sets may be different (e.g., mutually exclusive, not mutually inclusive) or the same (e.g., mutually inclusive).

In one embodiment, a plurality of accounts are associated with the same role for a set of property files 130. Accordingly, each account has the same access rights defined within that role for that set of property files 130.

In one embodiment, a user associates an first account with a role for a set of property files 130 and later removes that association. Accordingly, the first account no longer has the access rights within that role for that set of property files 130. For example only and not to limit the scope of the invention, in one situation, an individual member is an owner seeking representation in a sale transaction of a property. The individual member creates a "broker" role having suitable access rights to a property file 130 for the property. A broker has a service provider account. The individual member advantageously associates the service provider account for the broker with the broker role for the property file 130. Accordingly, the broker may use the suitable content from the property file 130. Upon dissatisfaction with the broker's services, the individual member advantageously removes the service provider account for the broker from the broker role for the property file 130. The individual member advantageously reassigns the broker role for the property file 130 to a second service provider account.

In one embodiment, a member may advantageously use the website 410 to grant access to a view to some or all of the members; the member may directly or indirectly invite one or more members to access the views. The view may be used for any suitable purpose, including but not limited to a for-sale listing, a for-lease listing, a property submittal package for a lender, equity investor submissions, submission to a tenant, or the like. In one embodiment, a member may use the website to select one or more members (e.g., developers, investors) and submit a view directly to the selected group. For example only and not to limit the scope of an invention, a developer or a property owner may advantageously submit a view to a group of tenants. Any appropriate member may create a view, including but not limited to developers, investors, sellers, governmental entities, or the like.

In one embodiment, the website 410 includes a searchable database of for-sale listing and displays the results of a related search. The for-sale searches may be performed using any suitable criteria (e.g., property type, property size, price range, location or the like). The for-sale listings are preferably viewable by some or all members and preferably include an asking price. The website 410 preferably includes a searchable database of for-lease listing and displays the results of a related search. The for-lease searches may be performed using any suitable criteria, including information contained within the associated property files (e.g., property type, property size, price range, location or the like). The for-lease listings are preferably viewable by some or all members and preferably include an asking price.

In one embodiment, the website 410 includes for-sale listings that are judicially originated (e.g., bankruptcy, estate, forclosure sales, or the like).

In one embodiment, a member may share access to content in one or more property files to other parties (e.g., developers, investors, lenders, equity investors, or the like). Any suitable content may be shared, including but not limited to financial information. Access may include any suitable combination of viewing, editing, exporting, adding, or the like. Access rights may vary according to the type of party.

Members

A member account may be used by any suitable industry participant, including but not limited to an owner (or investor), a developer, a broker, a client of a broker, or the like. Such participants may advantageously use the commercial real estate transaction system 110 for any suitable purpose such as tracking properties they already own, tracking properties for future acquisition, viewing properties, or the like. Further, an industry participant (e.g., a broker or the like) may advantageously use the commercial real estate transaction system 110 for future marketing of goods, services, or both to property owners. A member account may use the commercial real estate transaction system 110 for any other suitable purpose, whether for commercial real estate, for residential real estate, or for non-real estate purposes.

An investor member or owner member preferably uses the commercial real estate transaction system 110 for creating a property file 130 for each property that the member owns. When a plurality of investors or owners own a property, the commercial real estate transaction system 110 can advantageously provide each with access to the related property file (e.g., they may be given equal access rights to the file). Accordingly, the plurality of investors or owners can have the same, current information on the property. The property file 130 preferably includes the information about that particular property that the investor or owner possesses. The investor or owner may advantageously add information to a property file 130 by accessing goods, services, or both from a service provider, as described herein.

An investor or owner may use the commercial real estate transaction system 110 to generate reports, presentations or the like from information in the property file 130. For example, when the investor or owner desires to sell a property, the investor or owner selects a report function that generates a related sales presentation and due diligence package. In one embodiment, when an investor or owner sells a a parcel of property, the contents of the seller's property file 130 for the parcel may be merged with the purchaser's property file 130 for the parcel. The merged contents preferably include history data associated with the property file 130. A seller may maintain a property file 130 for any suitable purpose, including but not limited to for tax or partnership needs.

An investor member, a developer member, or a broker member preferably uses the commercial real estate transaction system 110 for creating a property file 130 for each property of interest, such as for acquisition. The member begins the origination process by identifying possible properties that meet certain requirements of each individual member, identifying the property owner, and contacting the property owner. In one embodiment, the member uses a property file contact management system to contact the property owner, as described herein. An investor member, a developer member, or a broker member may advantageously add content to a property file 130 by accessing goods, services, or both from a service provider, as described herein. For example, the member may access any suitable service including but not limited to deeds, title reports, or the like. Accordingly, the member can gain a better understanding of the property without directly contacting the property owner. As discussed above, in one embodiment, when an investor or owner sells a property, the contents of the property file 130 of the seller may advantageously be merged into the property file 130 of the purchaser (e.g., the investor, developer, or the like).

A broker member may advantageously use the commercial real estate transaction system 110 to build a list of properties of interest (e.g., representation for purchase by a client, representation for leasing, representation for sale, or the like). Accordingly, the broker member may rapidly gather information on a portfolio of properties. This portfolio of property files becomes a valuable asset for the broker member. As discussed below, in some embodiments, the broker member may advantageously retain the possession of the portfolio of property files, depending on the type of relationship (if any) under which the files were created. For example, a broker may create a company member account in which possession of the property files created under the company member account will remain with the company. Accordingly, independent contract agents or employees are less likely to leave with the company's information assets as kept in the company's property files 130.

The guest member can advantageously use a property file, after a company member or an individual member creates a property file 130 and grants the guest member access rights to the property file 130. For example, a broker may create a guest member account for the broker's client. When the broker identifies a property for the client, the broker creates a corresponding property file 130 and grants his client's guest member account access rights to the property file 130. However, the broker might be comfortable allowing the client to view some basic information, photographs, or the like, but not to view ownership information. Accordingly, the broker may create a view of the property file 130 to limit the contents shown to the client. After the view is created, the broker can advantageously use the commercial real estate transaction system 110 to submit the view for the client's acceptance. Once accepted, the client can view the allowed portions of the property file. Of course, if the client is interested in the property, the broker could seek the right (e.g., exclusive, non-exclusive) to represent the client in the possible acquisition of the property for a suitable period of time.

Providing Content

As illustrated in FIG. 3C, a service provider with a service provider account uses the commercial real estate transaction system 110 to provide content to a guest, to a member having possession of a property file 130, or both. The term "content" is a broad term, and is used in its ordinary sense, and further includes without limitation goods, services, work product, data or the like. As illustrated in FIG. 1, examples of service providers include but are not limited to include accountants, appraisers, attorneys, architects, engineers, contractors, brokers, escrow companies, title companies, financial companies, insurance companies, marketing companies, governmental entities, photographers, property managers, or the like. Of course, any other suitable service provider, shown or not shown in FIG. 1, may use the commercial real estate transaction system 110.

A service provider may advantageously use a service provider account to use the commercial real estate transaction system 110 for providing content. In some situations, a service provider may provide a service that results in the creation of work product (e.g., a photographer's photographs, an attorney's contract, an appraiser's appraisal, or the like), provide data (e.g., ownership information, sales information, tax information) or the like regarding a property, or provide a product (e.g., a title report, title insurance) or the like, which are preferably added to the property file. When providing content to a guest member, the service provider may advantageously transmit the content directly to the guest member.

Figure 4:
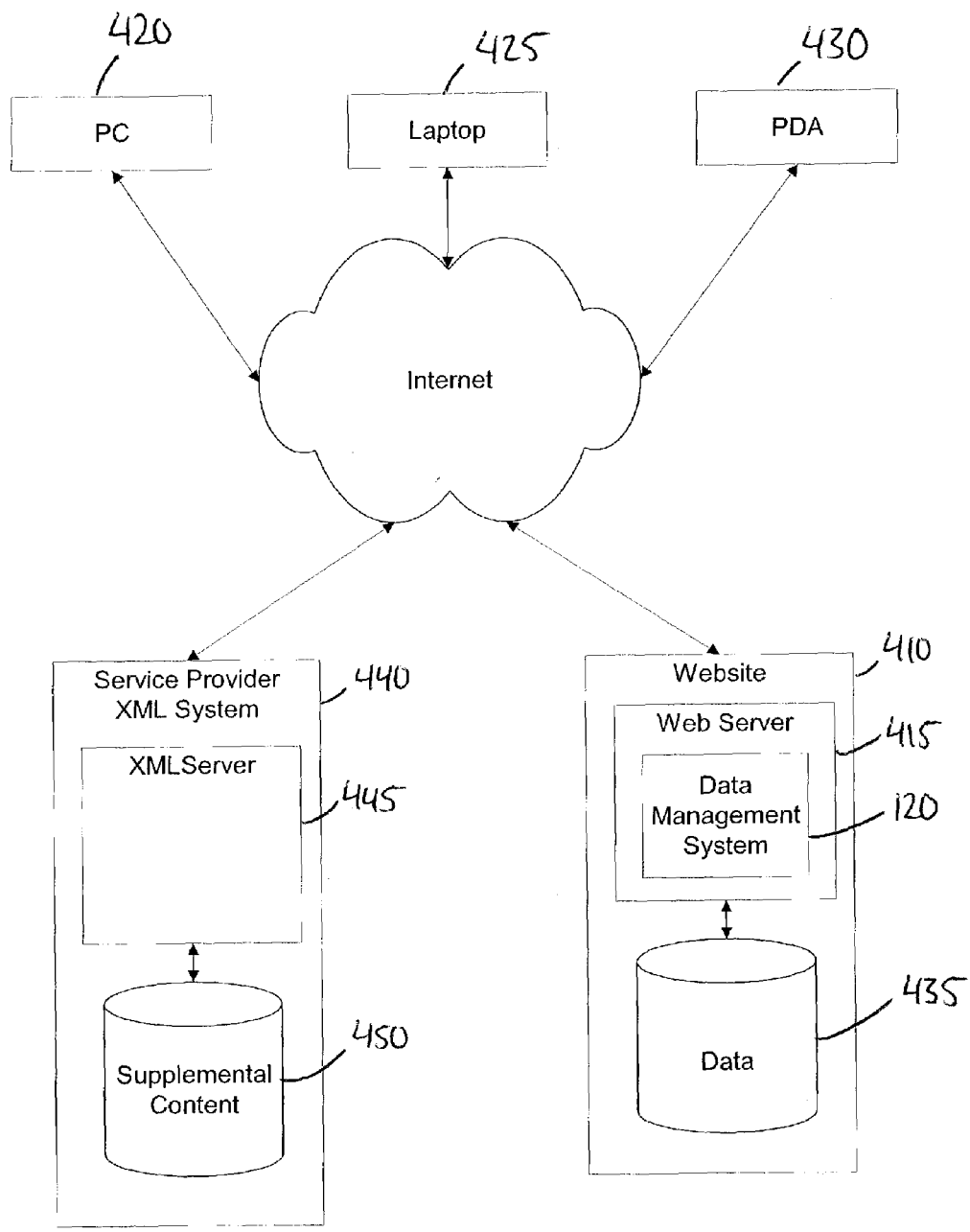
FIG. 4 illustrates a block diagram of a commercial real estate transction system, in accordance with an embodiment of the invention.

FIG. 4 illustrates a website 410 hosted by a web server 415 according to one embodiment. A user accesses the website 410 using a web broswer operating on any suitable device such as a personal computer 420, a laptop 425, a personal digital assistant 430, a portable computing device (not shown), or the like.

The user preferably accesses the functionality of the commercial real estate transaction system 110, the data management system 120, the property file application module 210, the property file access module 220, and the property file relationship management module 230 using a web browser. In another embodiment, any suitable method may be used to access and implement such functionality, including but not limited to a client module (e.g., a rich client) operating on the personal computer 420, the laptop 425, the personal digital assistant 430, or the like and communicating with a remote server module.

Web Server—depending upon the context, is (a) a program that, using the client/server model and the World Wide Web's Hypertext Transfer Protocol (HTTP), serves the files that form Web pages to Web users (whose computers contain HTTP clients that forward their requests), or (b) a computer connected to the Internet on which a Web server program operates. Generally, a server is a computer or program that controls a central repository of data that can be downloaded and manipulated in some manner by a client.

The web server 415 comprises the data management system 120 and accesses a database 435 or other suitable storage for storing data (e.g., membership account data, access rights data, property-related data, or any other suitable data) used by the data management system 120. In one embodiment, the database 435 comprises a plurality of databases for storing data used by the data management system 120. In one embodiment, the database 435 comprises a database of statically-stored, property-related data and a database of membership account data and access rights data. Any suitable combination of data can stored in any suitable location.

FIG. 4 illustrates an XML system 440 comprising an XML server 445, according to an embodiment of the invention. In one embodiment, the XML system 445 accesses a source of information, content or the like stored in a database 450 or other suitable storage.

In one embodiment, the database 450 comprises dynamically-stored, property-related data and the database 435 comprises a database of statically-stored, property-related data; a user preferably executes a search of the property-related data in the database 435, the property-related data in the database 450, or both. In response to the search, some of all of the data identified in the search is incorporated into a property file 130 using any suitable method.

In one embodiment, a service provider uses the XML system 440 to offer goods, services, or both to users of the website 410. Accordingly, an operator of the website 410 may advantageously create a contractual relationship with the service provider to process a transaction via the website 410, via the service provider's own processing system, via another suitable system, or any suitable combination thereof. The XML system 440 and the website 410 preferably communicate using any suitable communications network, such as the Internet, a local area network, a wide area network, or the like.

In one embodiment, the service provider is preferably provided with a software development kit that enables the service provider to integrate its back-end processing system with the user interface of the website 410 and the data delivery system of the website 410. Specifically, the service provider preferably creates a website plug-in that enables the service provider to integrate their service offerings into the website 410.

The website plug-in preferably is configured for one or more of the following: a type of goods or service (e.g., escrow services, legal services, or the like), securable activities, storage characteristics, a web-service interface, a user interface, a private service indication, or any other suitable aspects.

The list of securable activities advantageously includes what transactions, activities, services, goods, or the like are offered by the service provider via the website 410. Accordingly, in an embodiment wherein access rights are used, an administrator of access rights may view the securable activities offered by a service provider, and granted access to use some or all of the secured activities to one or more users. The storage characteristics advantageously define how the offered information or content is stored. For example, content may be stored within the database 435, within the database 450, within any suitable computer system, or any suitable combination thereof.

In one embodiment, content is retrieved from the XML system 440 and statically stored in the database 435. The website 410 may monitor the statically stored content in the database 435 to determine whether the statically stored content is different from the corresponding content in database 450; if the website 410 determines that it is different, the website 410 provides an alert to the user to manually request the changed content. The XML system 440 may monitor the statically stored content and provides an alert to the user to manually request the changed content.

In one embodiment, the website 410 uses information in a property file 130 to order a preliminary title report for the property and/or copies of some or all of the documents mentioned in the preliminary title report, which may advantageously be stored as part of the property file. The website 410 preferably provides an alert to the member when a change occurs in the property's status in a preliminary title report (e.g., change in ownership, notice of defaults, foreclosures, or the like). In one embodiment, the alert may be presented in an alert web page displayed to a user upon logging into the website 410. Any other suitable alert may be provided including but not limited to an email. The alert to the change in status may include an offer to purchase an updated title report. The website 410 preferably creates a billing record for tracking the number of offers to purchase an updated title report that have been provided. Accordingly, the offering party may be charged an associated advertising fee.

In one embodiment, the statically stored content in the database 435 is updated using the content from the database 450 according to any suitable time period, including but not limited to a daily retrieval. In another embodiment, content is retrieved dynamically from the database 435; accordingly, the website 410 advantageously displays the content taken from the XML system 440.

The web service interface advantageously defines the interface from the website 410 to the service provider's system to retrieve the data. For example, the interface may define function calling or the like. In a preferred embodiment, content is sent from the XML system 440 to the website 410 using XML documents or the like. Any suitable method of sharing content may be used among the XML system 440, the website 410, another computer system, or any combination thereof. The user interface preferably defines the user interface for displaying an offer to a user, user interface for the delivered content to a user, or both. In one embodiment, the property file 130 comprises a display of a plurality of tabs, and the delivered content is integrated into an existing tab. In another embodiment, the purchased content is integrated in a new tab though which the service provider preferably interacts with the user.

In a preferred embodiment, some or all of the content from a property file 130 (e.g., tax authority parcel number, address, photographs, ownership information, or the like) is sent from the website 410 to the XML system 440 using XML documents or the like. The XML system 440 preferably uses the content from the property file 130 to generate supplemental content to be added to the property file 130. In one embodiment, the XML system 440 automatically generates the supplemental content. In another embodiment, a person uses the XML system 440 to generate the supplement content. The supplemental content is then preferably sent from the XML system 440 to the website 410 using XML documents or the like. The supplemental content is preferably automatically added to the property file 130. In one embodiment, the website 410 prompts a user prior to adding the supplemental content to the property file 130. Any suitable service provider, including but not limited to those described herein, may add supplemental content using this or other suitable processes. Any suitable content from a property file 130 may be sent to the XML system 440. Further, any non-XML-based system may be used to provide supplemental content.

The private service indication preferably indicates one or more users to whom the services are offered. For example, in one situation, a service provider uses the website 410 to offer goods, services, or both to a single member. In another situation, the service provider has the ability to create property files and provides the service within the service provider itself. For example, a service provider may have data in its sales force automation system. Accordingly, the service provider could create a user interface (e.g., a tab or the like) for the information from its sales force automation system. Accordingly, the service provider would create property files with a custom tab for its internal use, for sharing with others, or both.

In one embodiment, the website 410 prompts a user to select types of service providers from which the user would prefer to receive content. The website 410 may advantageously prompt a user to disable offers from service providers.

In one embodiment, the website 410 includes an interactive service provider directory that can advantageously display a set of service providers according to one or more suitable criteria, including geographic location, service type, or the like. A member may select one or more of the set of service providers to request information (e.g., price quotes, product descriptions, or the like). The member may request information using any suitable method, such as website email or the like. A service provider may preferably filter out unwanted requests according to any suitable criteria, including geographic location, property type, property size, or the like. In one embodiment, the website 410 allows a service provider to create a personalized sub-website within the website 410. In one embodiment, the displayed set of service providers includes links to service providers' sub-websites. The access to the interactive service provider directory is preferably limited to members of the website 410.

In one embodiment, in response to the member submitting a request for information, information from the property file 130 is provided to the service provider's system, which advantageously prepares a customized offer for display at the website 410. The website 410 preferably retrieves the offers and displays a list of the offers. The member may then choose an offer, if one is acceptable.

Accountants can perform a range of suitable tasks for members (e.g., monthly accounting services, annual property audits, preparation of tax returns, or the like). A member may grant the accountant access rights to use any task-related information and to upload the results of the task into the property file. In a preferred embodiment, the member views a history of the activity in the property file 130 using an audit module, according to embodiments disclosed herein.

Appraisers assess the value of a parcel of property. A member may grant the appraiser access rights to use any task-related information (e.g., property description, location, income, expenses, loan and title information, exterior photographs, interior photographs) and to upload the results of the task into the property file. Once the appraiser uploads the assessment, the member may then view the uploaded assessment, and, if desired, grant the right to view the assessment to others.

In one situation, a member may grant the appraiser access rights to use any task-related information and to upload the results of the task into the property file. For example, the property manager can upload income information, expense information, or the like into the property file. Accordingly, the member may review the information, along with any others to which the member has granted access rights.

Attorneys provide various services to various members during the property ownership cycle (e.g., ownership, leasing, property management, acquisition, disposition, or the like). Accordingly, a member may grant the rights to view and collaborate on a document in a property file 130 to a guest and a service provider (e.g., the attorney). When the member, guest, and attorney approve, the document is advantageously saved in the property file. Because each works with the same document, some redundant activities are eliminated.

Architects, engineers, contractors or the like can provide varied services for members. For example, one of these many situations is when a developer wishes to develop a property. The interactive service provider directory may include architects, engineers, contractors or the like. The architect, engineer, contractor or the like preferably provide a customized integrated user interface within the property file 130 for information related to their services. For example, the interface may include a portion for the zoning and development standards from the municipality with jurisdiction over the property. Accordingly, the standards may advantageously be uploaded into the user interface in suitable format such as a digital format, as a scanned document, or the like. In another embodiment, the standards are available from a governmental entity service provider. The member preferably may grant access to view a history of the activity in the property file 130 using an audit module, according to embodiments disclosed herein. Accordingly, redundant work is reduced.

Brokers provide consulting; leasing representation, acquisition representation, disposition representation, or the like. The interactive service provider directory preferably includes brokers. Brokers may advantageously create property files for properties related to the services they provide. In a preferred embodiment, where a broker uses a property file 130 created by a member, the member views a history of the broker's activity in the property file 130 using an audit module, according to embodiments disclosed herein.

In a real estate transaction, an escrow provides services for financial transactions, acquistion transactions, disposition transactions or the like. The interactive service provider directory preferably includes escrow companies. In one situation, a member hires a title company. In another situation, the member grants a previously hired escrow company access to hire a title insurance company for a property file. The interactive service provider directory preferably include title insurance companies. In some instances, title insurance companies can provide title insurance or many other services. For example, a title insurance company may provide a survey such as one for an an American Land Title Association (ALTA) policy or the like. The member preferably uses the interactive service provider directory to solicit bids from the title insurance companies. Also, the title insurance company can advantageously offer preliminary title reports, copies of deeds, and copies of documents to member via the website 410.

Financial and Insurance providers provide varied services during the real estate life cycle. A member may grant the financial or insurance provider access rights to use any service-related information (e.g., property information, photographs, or the like), which thus allows the provider to give customized, less general quote and offer for services. This can save considerable time and money for the member.

Marketing and advertising firms can offer their services to members, other service providers (e.g., brokers), or both.

Often, a governmental entity governs a parcel of property within the entity's boundaries. Governmental entities pass laws, ordinances, regulations, or the like that affect the use and therefore value of a property. Governmental entities often spend a significant amount of resources responding to requests regarding the laws, ordinances, and regulations affecting a particilar property. In one situation, a governmental entity creates a service provider account for the website 410. Accordingly, the governmental entity preferably provides content regarding the laws, ordinances, and regulations via the website 410, which content may be added to a property file 130. This automated process reduces the amount of resources the governmental entity spends in responding to requests for property-related laws, ordinances, and regulations.

In one embodiment, photographers (e.g., aerial, architectural, or the like) maintain a plurality of images associated with coordinates for a global positioning system (GPS); the images are advantageously offered to members. In one embodiment, when a property file 130 is created using GPS coordinates as described in certain embodiments herein, the images corresponding to the coordinates are automatically added to the property file. The website 410 preferably includes an interactive photographer directory that can advantageously display a set of photographers (e.g., aerial photographers or the like) according to one or more suitable criteria, including geographic location or the like. A member preferably may flag one or more of the set of photographers to solicit offers. The member may solicit using any suitable method, such as website email or the like. In one embodiment, the website 410 allows a photographer to create a personalized sub-website within the website 410. The displayed set of photographers may include links to photographers' sub-websites. The access to the interactive insurer directory is preferably limited to members of the website 410, to the public, or both. In one embodiment, a member uses the website 410 to purchase photographs that are added to a property. The purchased photographs are preferably editable (e.g., for marking or the like).

Property File

In one embodiment, a member preferably uses the property file application module 210 to create a property file 130 for a parcel of property.

Figure 5:
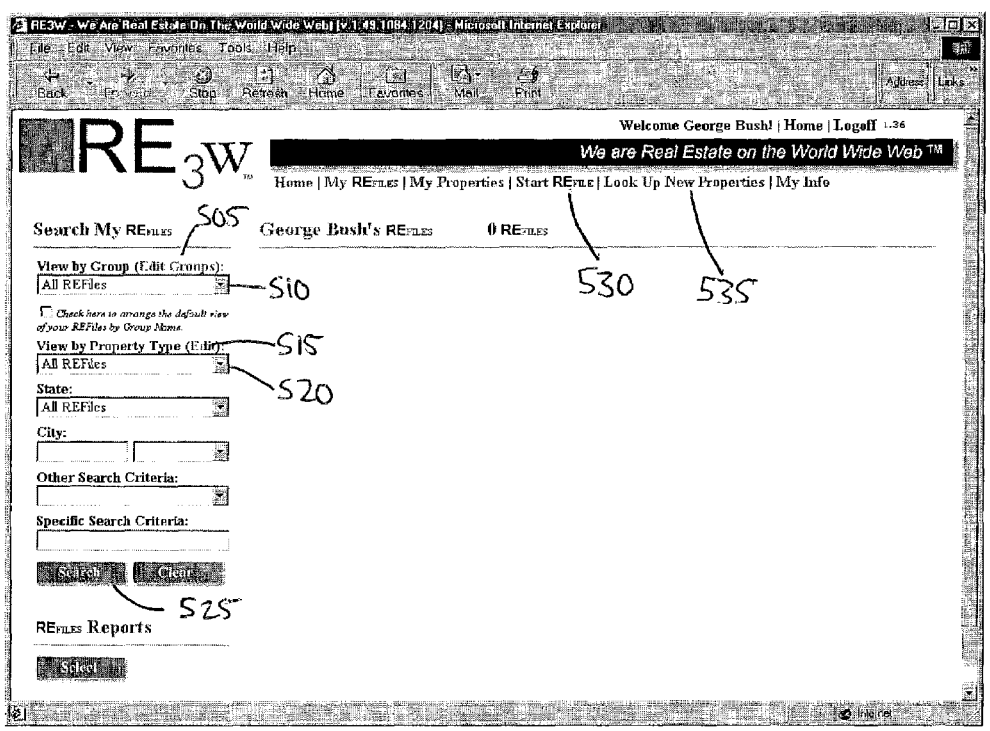
FIG. 5 illustrates a screen for viewing a set of property files, in accordance with an embodiment of the invention.

FIG. 5 illustrates a screen 500 according to one embodiment of the invention. The screen 500 comprises an edit groups hyperlink 505, a groups list box 510, an edit property type hyperlink 515, a property type list box 520, and a search button 525.

Figure 6A:
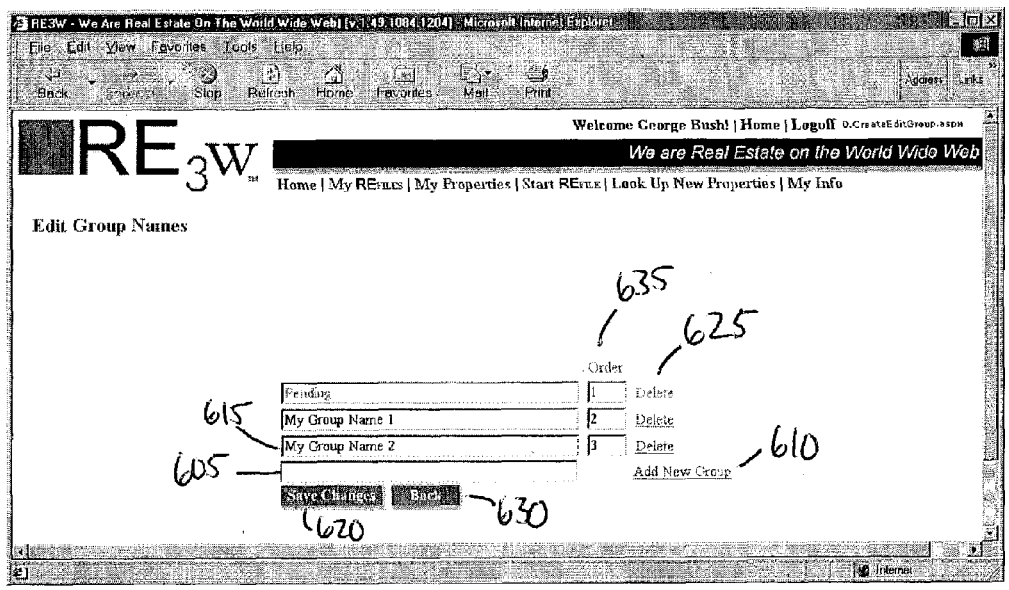
FIG. 6A illustrates a screen for managing a set of property file group names, in accordance with an embodiment of the invention.

In response to selecting the edit groups hyperlink 505 in FIG. 5, an edit groups screen 600 is displayed as illustrated in FIG. 6A. A user may enter the name of a new group in field 605 and select hyperlink 610 to add a new group. Upon selection of hyperlink 610, a new row appears with the newly chosen group name. The user may revise an existing group (e.g., field 615) and press button 620 to save the revisions. A group may be deleted using the corresponding delete hyperlinks 625. Selecting the back button 630 displays the screen 500. The order that the property files organized by group names are displayed in the screen 500 may advantageously be established by entering an order value in the order fields 635. As shown in some embodiments, a user may advantageously associate an individual property file 130 with one or more groups.

In one embodiment, the groups are advantageously color-coded. In one embodiment, a user may associate a color with the member-created group.

Figure 6B:
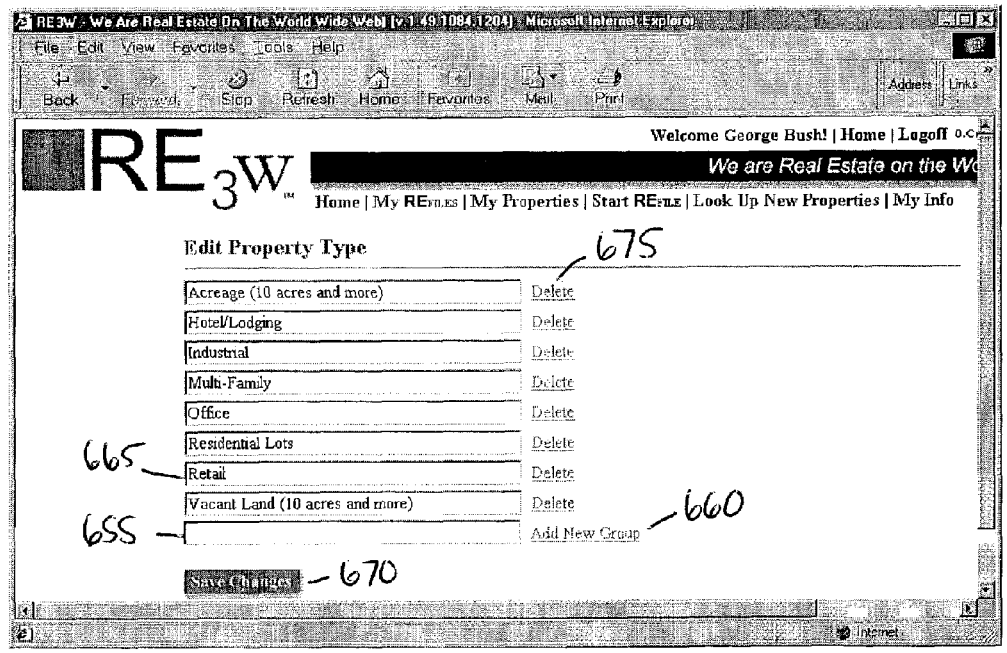
FIG. 6B illustrates a screen for managing a set of property file type names, in accordance with an embodiment of the invention.

In response to selecting the edit property hyperlink 515 in FIG. 5, an edit property type screen 650 is displayed as illustrated in FIG. 6B. A user may enter the name of a new property type in field 655 and select hyperlink 660 to add a new group. Upon selection of hyperlink 660, a new row appears with the newly chosen property type. The user may revise an existing property type (e.g., field 665) and press button 670 to save the changes. A property type may be deleted using the corresponding delete hyperlinks 675. As shown in some embodiments, a user may advantageously associate a property file 130 with a property type.

In one embodiment, screen 500 comprises one or more fields, list boxes, or the like for searching and displaying a user's property files in response to selecting the search button 525. In one embodiment, a user may execute a search restricted by group selected in the groups list box 510, restricted by property type selected in the property type list box 520, or both. Any suitable criteria may be used to search and display property files, including but not limited to state, city, zip code, keyword search, other search criteria, or the like.

Figure 7:
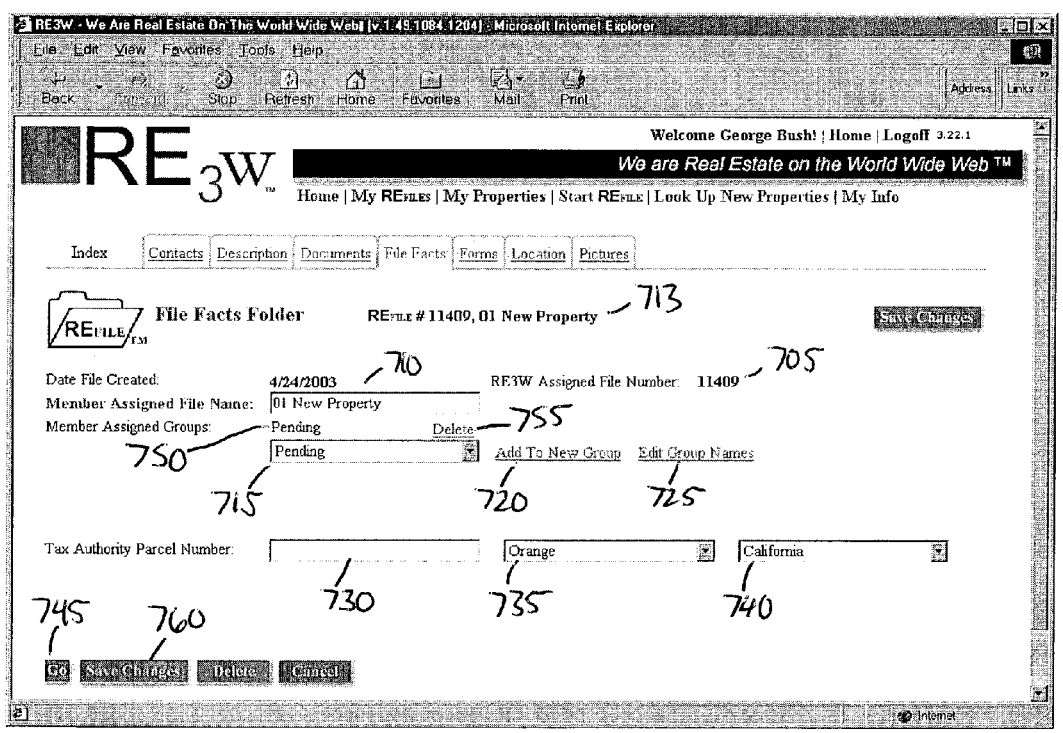
FIG. 7 illustrates a file facts tab for managing certain content within a property file, in accordance with an embodiment of the invention.

In one embodiment, selecting hyperlink 530 in FIG. 5 creates a new property file 130 as illustrated in FIG. 7. FIG. 7 illustrates a file facts tab screen 700 of the property file 130. The screen 700 advantageously includes a system-assigned file number 705, a user-assigned name field 710, a display of the user-assigned name and system-assigned file number 713, a group list box 715, an add to new group hyperlink 720, an edit group names hyperlink 725, a tax authority parcel number field 730, a county field 735, a state field 740, and a go button 745. A user may rename a property file 130 using the field 710. In one embodiment, a user may assign a property file 130 to one or more groups. For example, in response to the user selecting a group from group list box 715 and selecting the add to new group hyperlink 720, a new row (e.g., row 750 or the like) will appear, indicating the property file 130 is associated with the selected group. To remove a property file 130 from a group, the user may select a corresponding delete hyperlink (e.g., hyperlink 755). If a user wishes to create a new group, the user may select the edit group names hyperlink 725, which displays the screen 600 (FIG. 6A). The tax authority parcel number field 730 represents the tax authority parcel number, which is an identification assigned to a parcel of property by a governmental entity that seeks to tax the owner of the property. The county field 735 represents a county in which a property is located and the state field 740 represents the state in which a property is located.

In one embodiment, a database identifies property-related information using any suitable information such as a tax authority parcel number or the like. In one embodiment, if a user knows the tax authority parcel number, the user may enter it in field 730 and press button 745; in response, the website 410 retrieves property-related information associated to that tax authority parcel number and incorporates that information into the property file 130. In one embodiment, if the user does not know the tax authority parcel number of interest, the user leaves the field 730 blank and then selects button 745, which opens screen 800 in FIG. 8.

Figure 8:
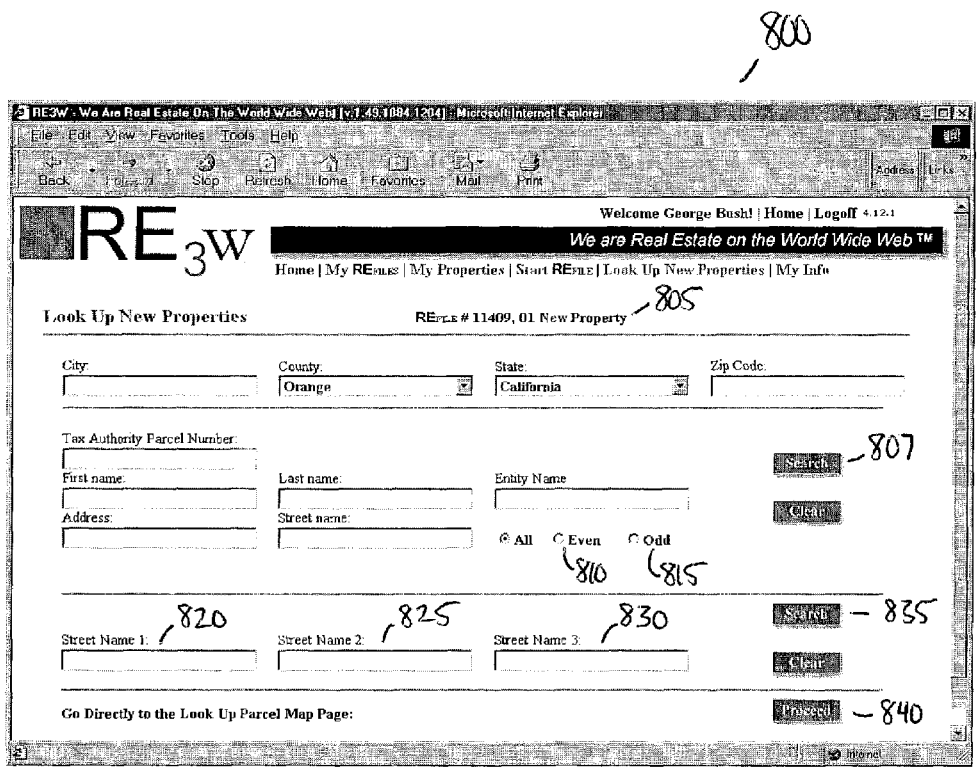
FIG. 8 illustrates a screen for searching properties, in accordance with an embodiment of the invention.
Figure 10A:
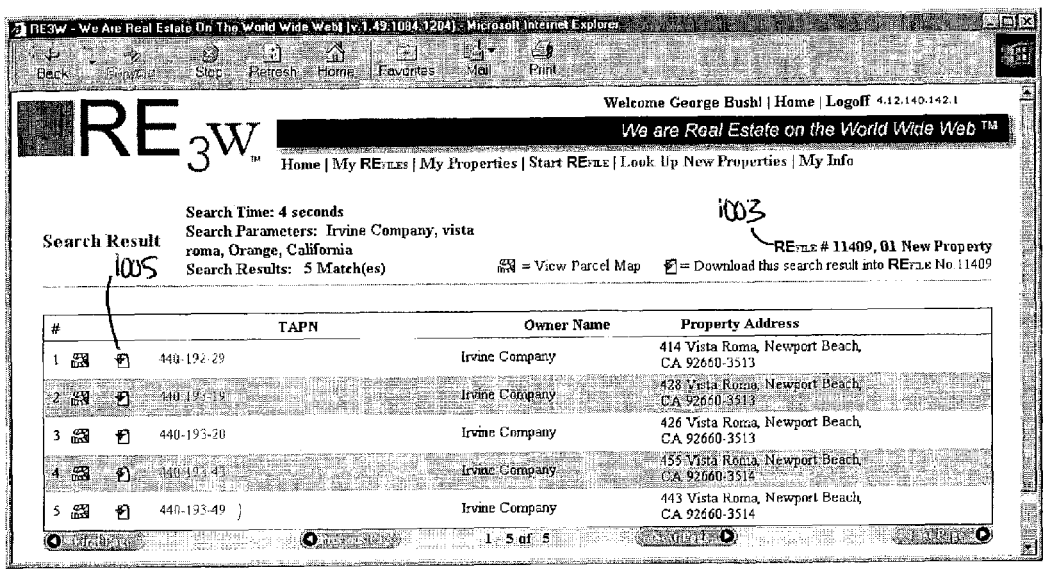
FIG. 10A illustrates a search results screen for displaying properties found as the result of a search, in accordance with an embodiment of the invention.
Figure 10B:
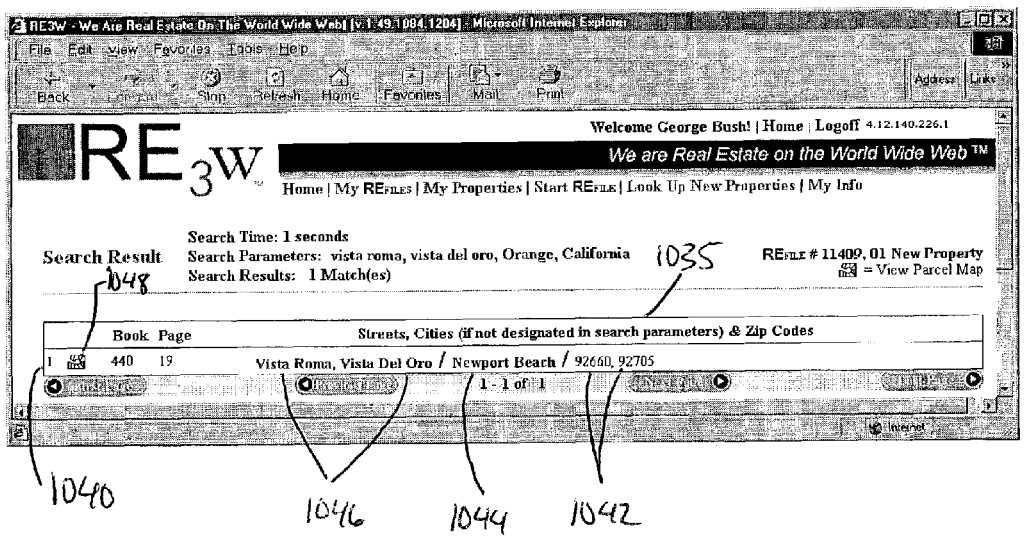
FIG. 10B illustrates a search results screen preferably for displaying maps found as the result of the process in FIG. 9, in accordance with an embodiment of the invention.

FIG. 8 illustrates an embodiment of the screen 800 in which a user may search a database of property-related data (e.g., database 435, database 450, or the like) to identify a parcel of property, and then incorporate the property-related data within the property file 130. The property file with which a user is working may advantageously be indicated using text 805 (e.g., the user-assigned name and the system-assigned file number). Accordingly, the user may execute a search of the database of property-related data by city, county, state, zip code, tax authority parcel number, owner first name, owner last name, legal entity owner name (e.g., corporation, partnership, or the like), address number, street name, or any suitable combination thereof. Upon entering the suitable criteria, the user may execute search by selecting button 807, which then displays the results of the search in a screen 1000 in FIG. 10A. The user may then incorporate property-related data for a property found in the search into a property file indicated by text 1003, as discussed in further detail below. Any suitable values may be used to execute a search, such as search terms, portions of search terms, "wildcard" characters, or the like.

According to one aspect of an embodiment, the screen 800 allows the user to limit the search to a particular side of a street. In some locations, one side of a street is even-numbered and the other side is odd-numbered. Accordingly, in one embodiment, a user may select one side of a street by selecting radio button 810 (for even-numbered) or radio button 815 (for odd-numbered) or any other selection mechanism supported by the user interface. Because one side of the street may be more valuable than the other (e.g., one side of a street might be coastal properties with an ocean view), a user may wish to view properties on the more valuable side of a street. A user may wish to limit the search to one side of a street for any other reason.

Multi-Street Searches

In some situations, a user is interested in a property that has no address of record (e.g., a vacant property) or in a property for which the user has no address and no tax authority parcel number. Accordingly, in one embodiment, the screen 800 (FIG. 8) allows the user to execute a search with two or more street names, which the user preferably knows are in the immediate vicinity of the property of interest. The search preferably identifies one or more tax authority parcel maps in the immediate vicinity of the property of interest. Tax authority parcel maps preferably display one or more parcels and display corresponding tax authority parcel numbers.

The user browses the identified tax authority parcel maps to determine if the property of interest is shown on one of the maps. If the property is not shown, the user browses related tax authority parcel maps (e.g., adjacent maps or the like) to locate the tax authority parcel map showing property of interest. Once the user locates the tax authority parcel map displaying the property of interest, the user may review the tax authority parcel map to determine the associated tax authority parcel number.

Figure 9:
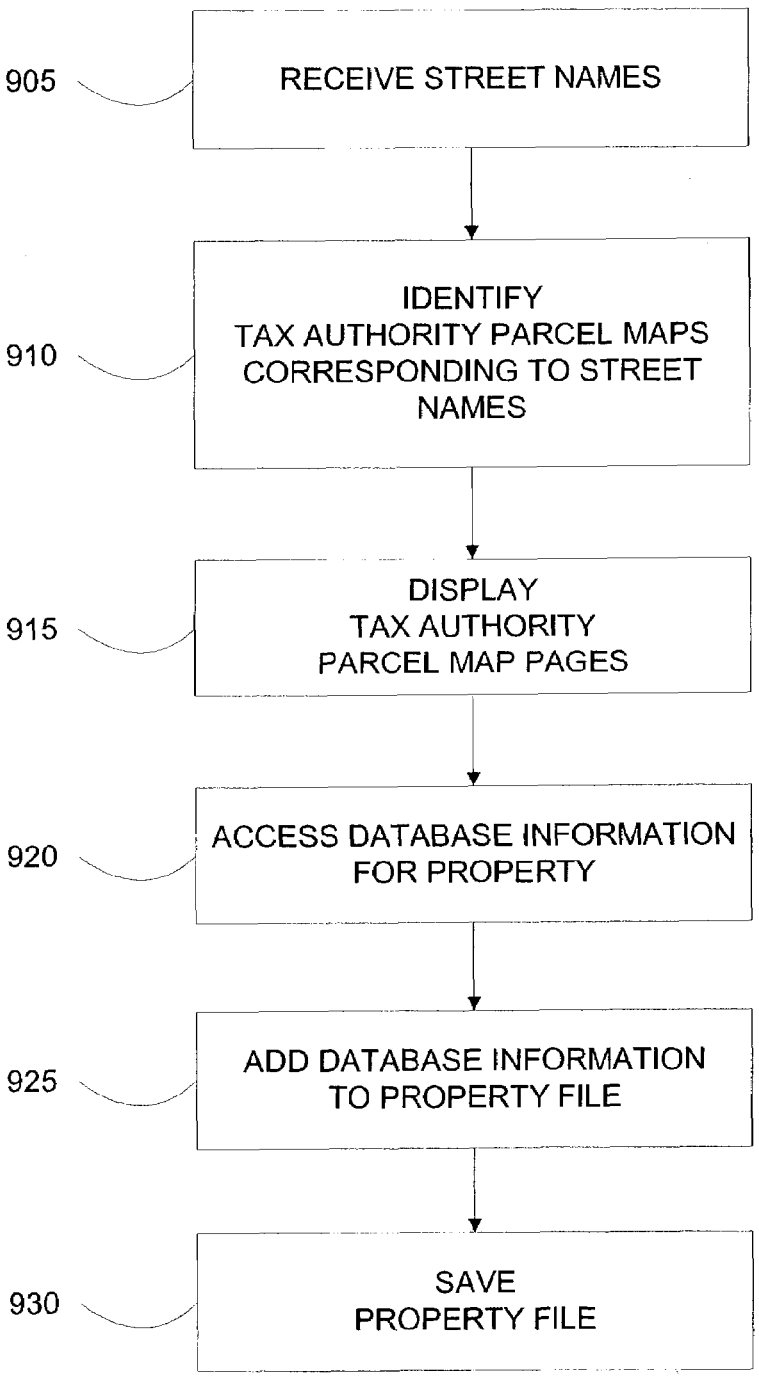
FIG. 9 illustrates a block diagram of a process for searching properties, in accordance with an embodiment of the invention.

For example, in one embodiment, to execute the search, the user enters two or more street names in any suitable combination of field 820, field 825, and field 830 and selects button 835. In response, the website 410 executes a process 900 (FIG. 9) according to one embodiment. At a block 905, the website 410 receives two or more street names.

At a block 910, the website 410 queries a database (e.g., database 435, database 450, or the like). In one embodiment, the database associates a tax authority parcel map with the set of properties shown on the map and also associates one or more properties with a street name (e.g., an address). Accordingly, at the block 910, the query identifies one or more tax authority parcel maps in which the properties shown have addresses corresponding to at least two of the street names entered by the user.

At block 915, the website 410 displays a screen 1030, according to one embodiment of the invention. The screen 1030 comprises a list 1035 of one or more tax authority parcel map rows (e.g., row 1040) for the tax authority parcel maps identified at the block 910. The tax authority parcel map rows preferably display zip codes 1042, the cities 1044, and the queried street names 1046 associated with the parcels shown on the tax authority parcel map.

To execute a search, the user preferably enters two or more street names in any suitable combination of field 820, field 825, and field 830, along with other suitable criteria as described with reference to FIG. 8, including but not limited to city, county, state, and zip code. In one embodiment, the cities are optionally not displayed in the tax authority parcel map row when a city was specified in the search criteria. In one embodiment, the user preferably enters one or more street names in field 820, field 825, or field 830, along with other suitable criteria as described with reference to FIG. 8, including but not limited to city, county, state, and zip code. Any suitable values may be used to execute a search, such as search terms, portions of search terms, "wildcard" characters, or the like.

Figure 10C:
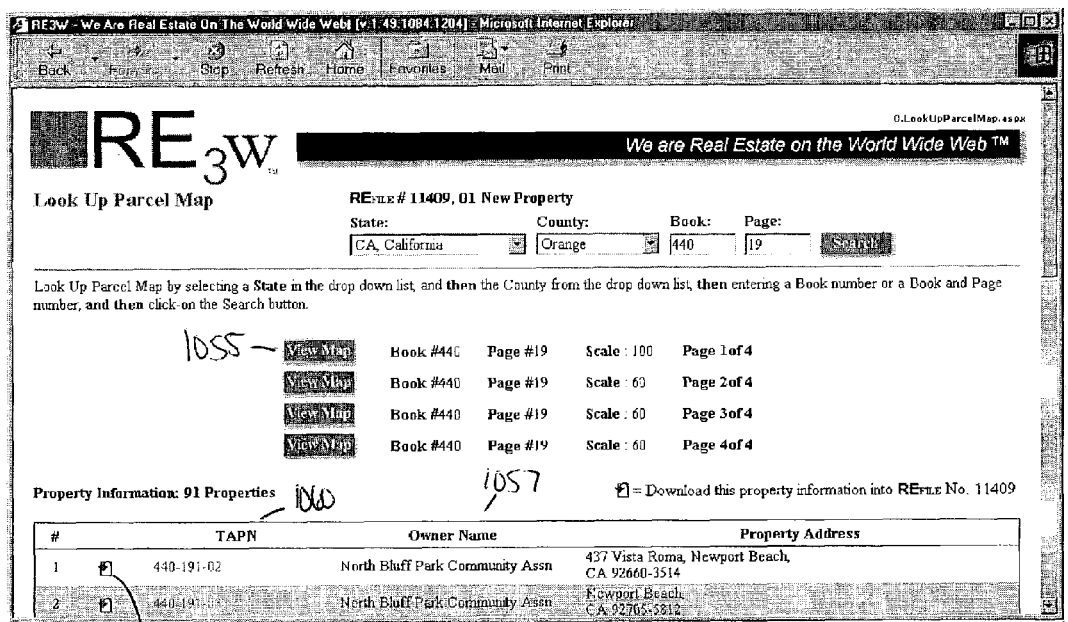
FIG. 10C illustrates a search map screen, in accordance with an embodiment of the invention.

Selecting a lookup parcel map button, (e.g., button 1048) causes the website 410 to display a screen 1050 (FIG. 10C), according to one embodiment of the invention. The screen 1050 further comprises a list 1057 of the properties shown in the selected tax authority parcel map. Selecting a view map button (e.g., button 1055) causes the website 410 to display an image of the corresponding portion of the tax authority parcel map (e.g., button 1055 corresponds to book 440, page 19, page 1 of 4). The user may then review the displayed image to determine what tax authority parcel number is associated with the property for which the user wishes to create a property file 130. When the user determines what the tax authority parcel number is, the user may locate that tax authority parcel number in the list 1057 by reviewing tax authority parcel number column 1060, which contains a list of tax authority parcel numbers. When the number is located, the user may select a corresponding load data button (e.g., button 1065); in response to the selection of the load button, at a block 920, the website 410 retrieves the corresponding data from database of property-related data, and, at a block 925, the website 410 incorporates the data into the property file. The user may then choose to save the incorporated data at a block 930. Similarly, as illustrated in the screen 1000 in FIG. 10A, a user may select a load button (e.g., button 1005) to incorporate property related data into the property file 130. In response to the selection of the load button (e.g., button 1005), the website 410 retrieves the corresponding data from database of property-related data and incorporates the data into the property file. The user may then choose to save the incorporated data. Although selecting load button (e.g. buttons 1005 and 1065) is illustrated, the interface could be designed to prompt the user to type in the parcel number or to click on an associated portion of the tax authority parcel map, and, in response, the website 410 could retrieve the corresponding data from database of property-related data.

Global Position Searches

In one embodiment, the database of property-related data (e.g., database 435, database 450, or the like) includes coordinates (e.g., longitude, latitude, or the like) associated with individual parcels of property. Accordingly, a user may have a mobile computing device comprising a GPS receiver, which is useful for the process 1100 shown in FIG. 11. In response to a user input, the GPS receiver retrieves its coordinates from a global positioning system at a block 1110. The mobile computing device transmits the coordinates to the website 410, which accesses the database of property-related data to determine the corresponding parcel of property at a block 1115. The website 410 retrieves the corresponding data from database of property-related data at a block 1120 and the website 410 incorporates the data into the property file at a block 1125. The user may then choose to save the incorporated data at a block 1130. This feature allows a user who is visiting a parcel of land to conveniently create a property file 130 for that parcel without having to know its parcel number or its address.

In one embodiment, an interactive map comprising an aerial photograph, satellite aerial photograph, or the like is configured to determine the coordinates of properties displayed in the interactive map. Upon user selection of a portion of the map, the coordinates associated with the selected portion are transmitted to the website 410, which queries a database of property-related data including coordinates. The website 410 displays one or more properties coordinates that correspond to the queried coordinates. Upon user selection of a displayed property, the website 410 creates a property file 130 for the selected property. In one embodiment, a street map overlay is provided wherein the streets are labeled on the photographs.

Content may be incorporated into the property file 130 in any suitable manner. In some embodiments, content may be automatically incorporated using a database search with screen 800 (FIG. 8), selecting load button 1005 (FIG. 10A), selecting load button 1065 (FIG. 10C), using process 900 (FIG. 9), using process 1100 (FIG. 11) or any suitable combination thereof. In one embodiment, content may be manually entered into a property file 130, manually uploaded, automatically entered, automatically uploaded, or any suitable combination thereof. Any other suitable methods of incorporating data into the property file may be used.

FIGS. 12A-17 illustrate embodiments of a property file 130 wherein a series of tabs (e.g., contacts, description, documents, file facts, forms, location, pictures) hold property-related content. Although the tabs comprise various fields, any suitable information may be displayed in a property file, including any subset of the information displayed, any other information that is not displayed, or both. Further, although certain tabs are displayed, additional tabs or fewer tabs may be used. Also, although tabs are illustrated, any suitable method of display may be used. The term "property file" is a broad term and is used in its ordinary sense and further includes without limitation a file comprising property-related content or aspects of some embodiments disclosed herein.

Figure 12A:
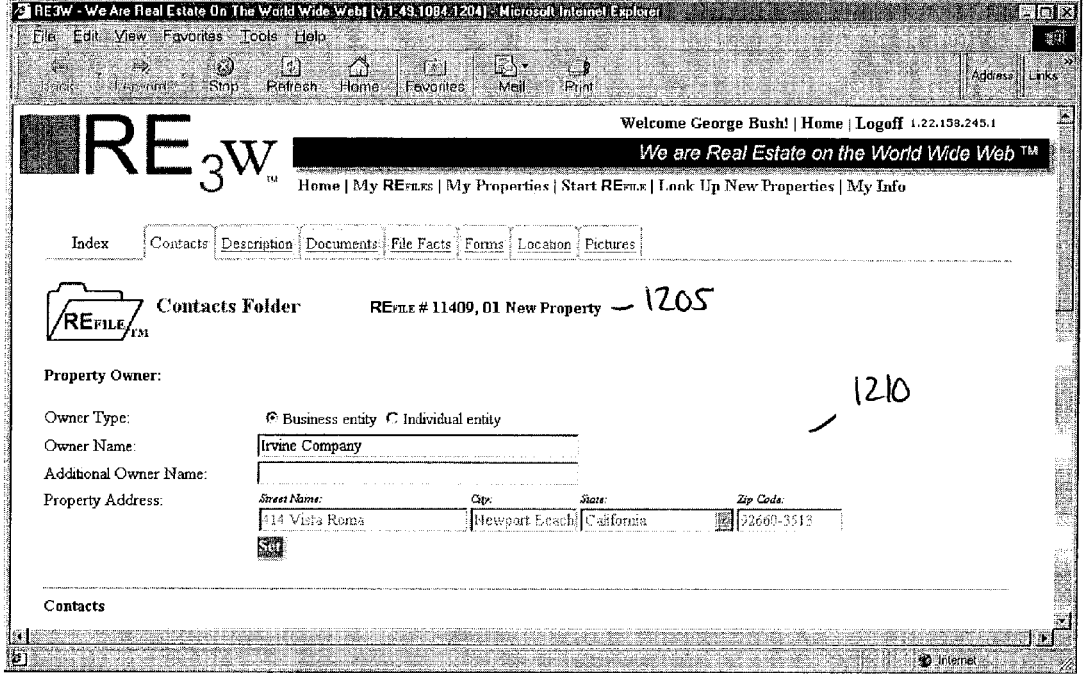
FIG. 12A illustrates a contacts tab for managing certain content within a property file, in accordance with an embodiment of the invention.

FIG. 12A illustrates a contacts tab 1200 for a property file 130 indicated by text 1205 in accordance with an embodiment of the invention. A property owner section 1210 of the contacts tab 1200 preferably comprises suitable owner-related information such as an owner type (e.g., business entity, individual entity), one or more owner names, and a property address.

Figure 12B:
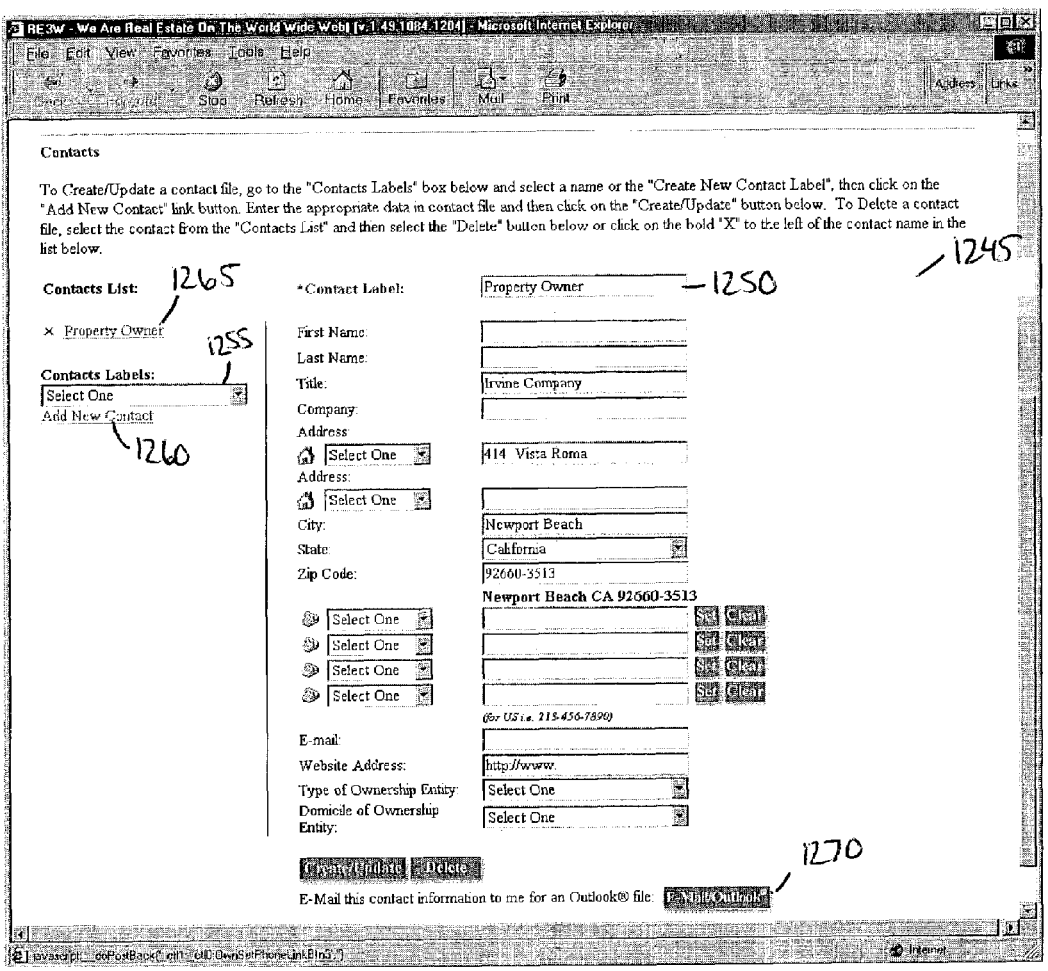
FIG. 12B illustrates a contacts tab for managing certain content within a property file, in accordance with an embodiment of the invention.

FIG. 12B further illustrates a contacts section 1245 of the contacts tab 1200. A list of contacts is provided; for example, the contacts section 1245 illustrates a contact for a property owner, as indicated in field 1250. A user wishing to create a new contact would select a contact label from the list box 1255 and select hyperlink 1260; in response, the website would display a new contact area 1245 for entering any suitable contact-related information and display a corresponding hyperlink (e.g., hyperlink 1265) for accessing the contact related information. The contact labels may comprise a broker/agent, a property manager, a property owner, a property owner from a deed, or any other suitable label. Further, in one embodiment, the list box 1255 advantageously includes a option to create new contact label wherein selection of the create a new contact label displays a screen adapted to allow the user to create, revise, or delete contact labels.

As illustrated in FIG. 12B, the contacts section 1245 includes any suitable contact-related information. The contract-related information may include the name of the contact label, the first name of the contact, the last name of the contact, the title of the contact, and the company of the contact. The contract-related information may include one or more addresses (e.g., business, home and mailing) and one or more telephone numbers (e.g., assistants, business phones, business faxes, home phones, home faxes, ISDNs, mobile, other faxes, pagers, primary phone, or the like). The contract-related information may include email addresses, a website addresses, type of ownership entity (e.g., a corporation, a general partnership, an individual, a limited liability corporation, a limited liability partnership, a limited partnership, a trust or the like), and a domicile of the ownership entity (e.g., states, countries, or the like).

As illustrated in FIG. 12B, the user may advantageously select a button 1270 to activate an export module configured to export the contacts information from the contacts tab 1200 into a document usable by a commercially available software program (e.g., a contact form for MICROSOFT OUTLOOK™, ACT™, or the like). The exported document preferably contains substantially the same content shown in the contacts tab 1200. In one embodiment, selecting the button 1270 further attaches the formatted document to email the contact information to the user, one or more other persons, or any suitable combination thereof.

In a preferred embodiment, the website 410 provides a property file contact management system (not shown) to manage communication with contacts (e.g., property owners, developers, investors, tenants, or the like). The property file contact management system uses information in one or more property files to create documents, including emails, commercially available documents (e.g., MICROSOFT WORD™ documents, MICROSOFT EXCEL™ spreadsheets), solicitation letters, or the like. In one embodiment, the property file contact management system includes a scheduling system for soliciting or otherwise communicating with contacts using any suitable method, including mail, telephone, email or the like; accordingly, the member has the ability to schedule follow up contacts.

In one embodiment, the property file contact management system accesses a searchable database of telephone numbers (e.g., white pages or the like). For example, the member may execute search using one or more of the data in the property file (e.g., owner name, property address, address of the vesting, address to where tax bills are sent, or the like) and retrieve relevant records from the database into the property file contact management system.

In one embodiment, the property file contact management system accesses a searchable database of public records, such DBA records, certificates of partnerships, or the like. Thus, the member can identify officers or other persons associated with DBA's, partnerships, or other business entities and then add one or more corresponding entries in the property file contact management system. The member may then search for the telephone number of the person or prepare documents as described above.

Figure 13A:
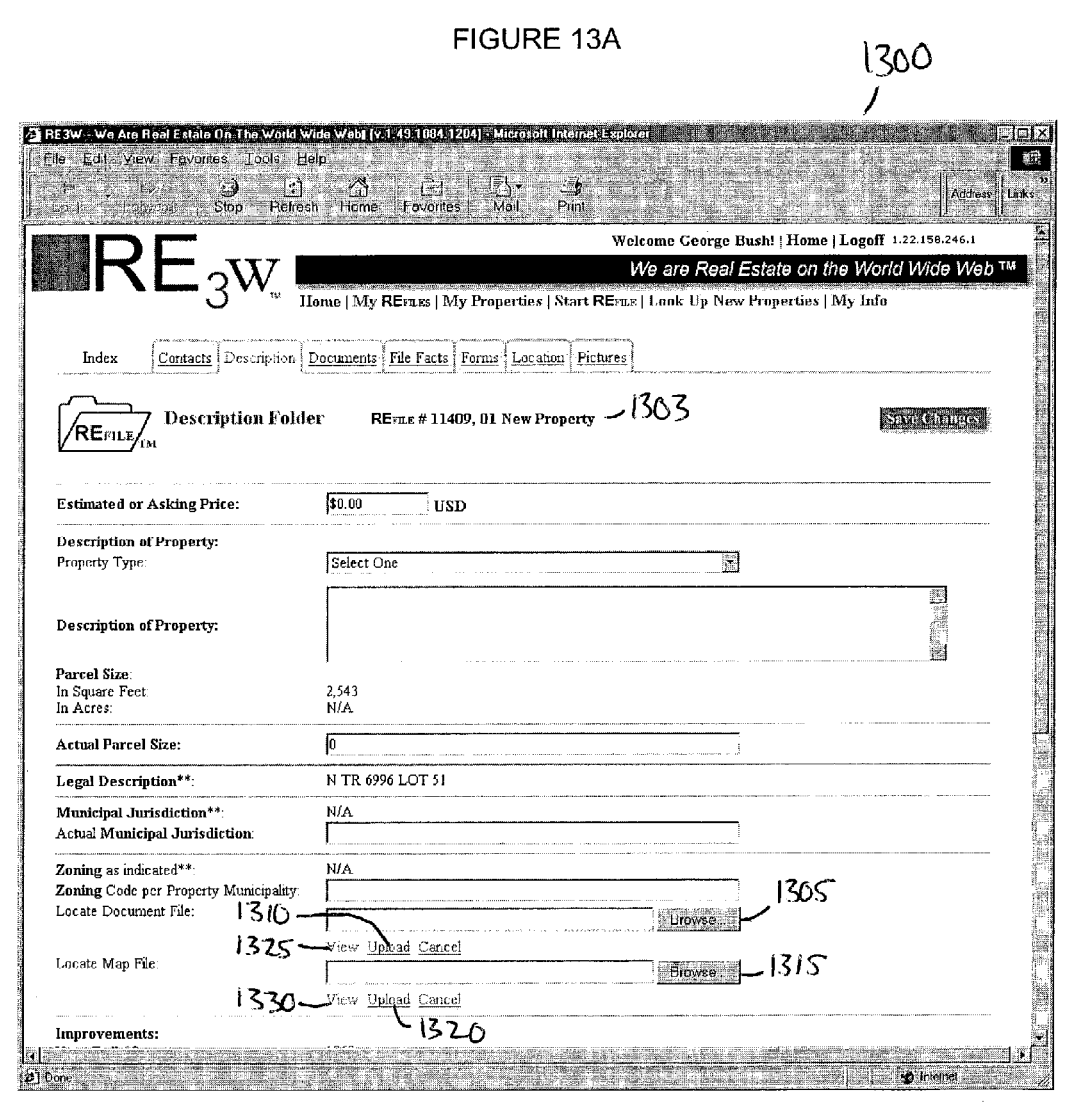

FIG. 13A illustrates a description tab 1300 for a property file 130 indicated by text 1303 in accordance with an embodiment of the invention. The description tab 1300 includes any suitable information. In one embodiment, the description tab 1300 advantageously provides one or more fields, text, or both for viewing, revising, and saving content, including an estimated or asking price for the property, a property type for the property (e.g., acreage—ten acres or more, hotel/lodging, industrial, multi-family, office, residential lots, retail, vacant land—ten acres or more, or the like), a description of the property, parcel size (e.g., acres, square feet), a legal description number, a governmental jurisdiction (e.g., a municipal), and governmental zoning code (e.g., municipal).

In one embodiment, the user may browse and select a document file related to zoning (e.g., zoning regulations or the like) using button 1305. Upon selection of the document file, the user may select hyperlink 1310 to upload the document file into the property file 130. Similarly, in one embodiment, the user may browse and select a file related to a zoning map (e.g., one or more portions of a zoning map or the like) using button 1315. Upon selection of the file, the user may select hyperlink 1320 to upload the file into the property file 130. In one embodiment, the user may advantageously view the uploaded file by selecting a corresponding view hyperlink (e.g., hyperlink 1325, hyperlink 1330) or the like.

As illustrated in FIG. 13B, the description tab 1300 advantageously provides one or more fields, text, or both for viewing, revising, and saving content, including the year a unit was built, the number of units built, the number of buildings on the parcel, building square footage, tax assessed value of the land, tax assessed value of improvements, total assessed value, tax amount, tax year, last date of sale, document number of the last sale, the last sale amount, tax authority parcel numbers associated with the sale, lender name, and one or more loan amounts.

Figure 14:
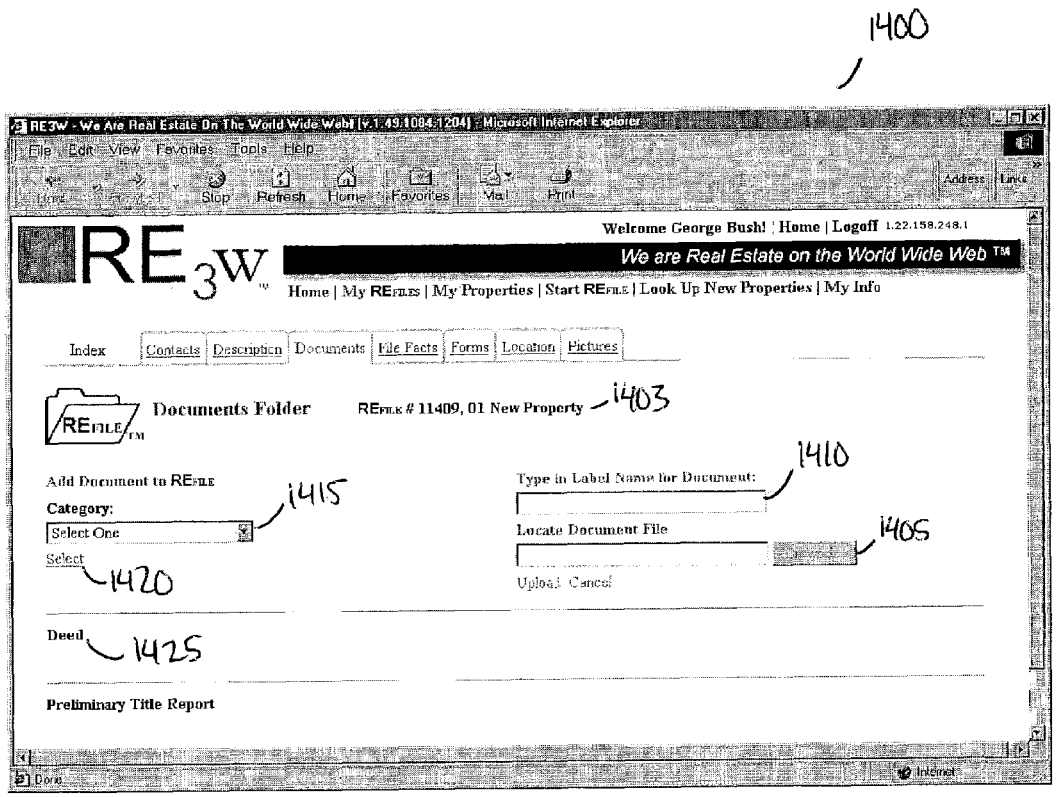
FIG. 14 illustrates a documents tab for managing certain content within a property file, in accordance with an embodiment of the invention.

FIG. 14 illustrates a documents tab 1400 for a property file 130 indicated by text 1403 in accordance with an embodiment of the invention. In one embodiment, the user may browse and select a document file using button 1405, enter a name into a field 1410, and select a document category from a list box 1415. The user may select hyperlink 1420 to upload the document file into the property file 130. In one embodiment, the uploaded documents are displayed under a heading (e.g., heading 1425) corresponding to a document category. In one embodiment, the uploaded documents are scanned documents, electronic documents, or any other suitable document. Any suitable categories of documents may be used including but not limited to deeds, preliminary title reports, or the like. In one embodiment, the user may advantageously view the uploaded file by selecting a corresponding view hyperlink or the like.

Figure 15:
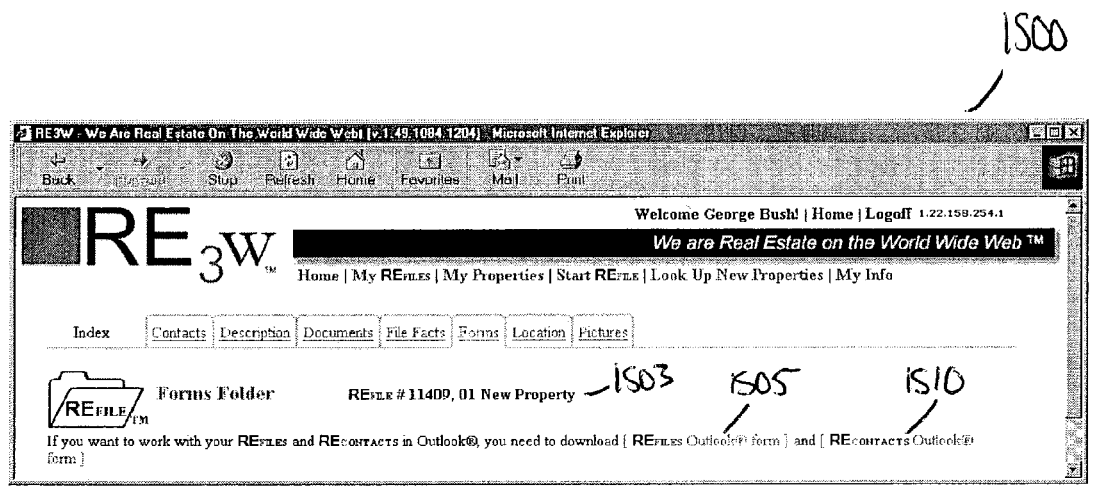
FIG. 15 illustrates a forms tab for managing certain content within a property file, in accordance with an embodiment of the invention.

FIG. 15 illustrates a forms tab 1500 for a property file 130 indicated by text 1503 in accordance with an embodiment of the invention. In one embodiment, forms compatible with a commercially available contact system (e.g., MICROSOFT OUTLOOK™, ACT™, or the like) are advantageously downloadable for a user's computing device including but not limited to a personal computer, a laptop computer, a personal visual assistant, a portable computer device, or the like.

In one embodiment, the user advantageously selects a hyperlink 1505 to activate an export module configured to export information from the property file 130 into a document usable by the commercially available software program. The exported document preferably contains substantially the same content shown in some or all of the property file 130. For example, in one embodiment, the exported document preferably contains substantially the same content illustrated in the series of tabs (e.g., contacts, description, documents, file facts, forms, location, pictures) illustrated in FIGS. 12-17. In one embodiment, the export document preferably contains some of the content illustrated in the series of tabs.

In one embodiment, the user advantageously selects a hyperlink 1510 to activate an export module configured to export the contacts information from the contacts tab 1200 into a document usable by the commercially available software program. The exported document preferably contains substantially the same content shown in some or all of the contacts tab 1200.

Figure 16:
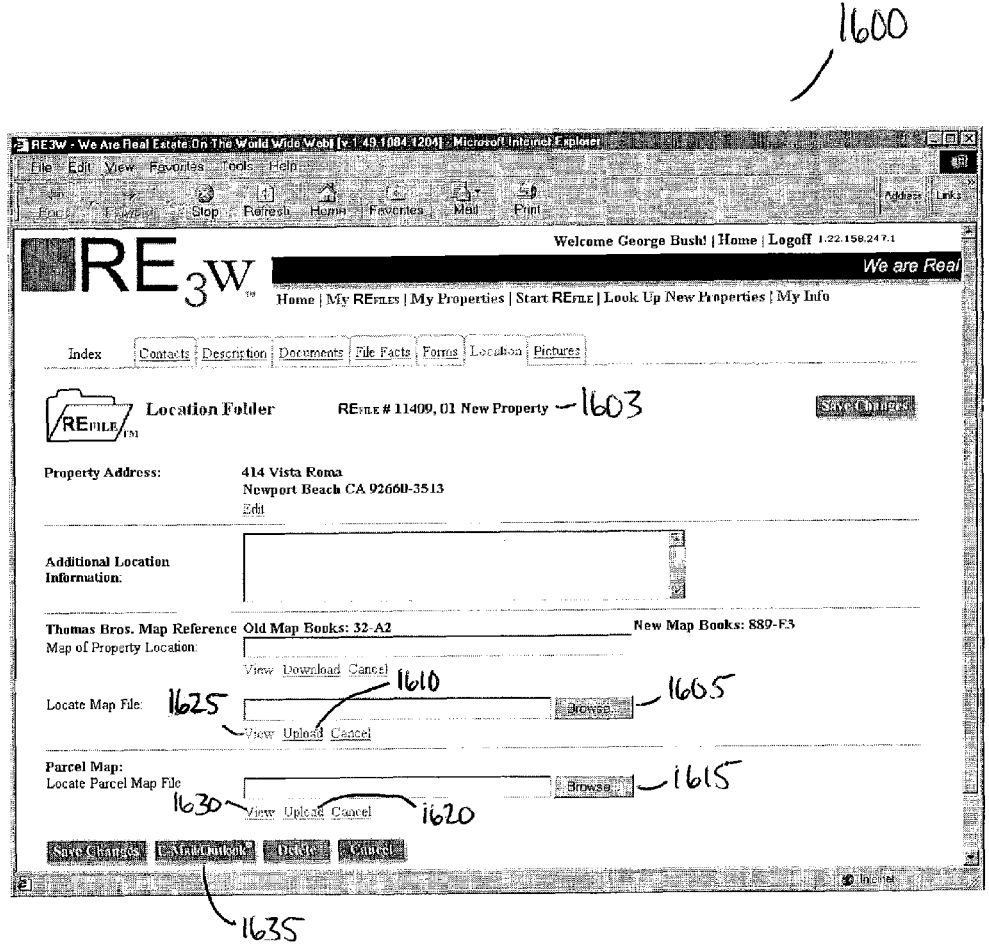
FIG. 16 illustrates a location tab for managing certain content within a property file, in accordance with an embodiment of the invention.

FIG. 16 illustrates a locations tab 1600 for a property file 130 indicated by text 1603 in accordance with an embodiment of the invention. The locations tab 1600 includes any suitable information. In one embodiment, the locations tab 1600 advantageously provides one or more fields, text, or both for viewing, revising, and saving content, including a property address, additional location information, one or more references (e.g., page, grid coordinates, or the like) for a commercially available map (e.g., THOMAS BROTHERS™) or the like.

In one embodiment, the user may browse and select a commercially available map file or the like using button 1605. Upon selection of the commercially available map file, the user may select hyperlink 1610 to upload the commercially available map file into the property file 130. Similarly, in one embodiment, the user may browse and select a parcel map file (e.g., tax authority parcel map) or the like using button 1615. Upon selection of the file, the user may select hyperlink 1620 to upload the file into the property file 130. In one embodiment, the user may advantageously view the uploaded file by selecting a corresponding view hyperlink (e.g., hyperlink 1625, hyperlink 1630) or the like.

In one embodiment, the user may advantageously select a button 1635 to activate an export module configured to export the contacts information from the locations tab 1600 into a document usable by a commercially available software program (e.g., a form for MICROSOFT OUTLOOK™, ACT™, or the like). The exported document preferably contains substantially the same content shown in the locations tab 1600. In one embodiment, selecting the button 1635 further attaches the formatted document to an email for emailing to the user, one or more other persons, or any suitable combination thereof.

Figure 17:
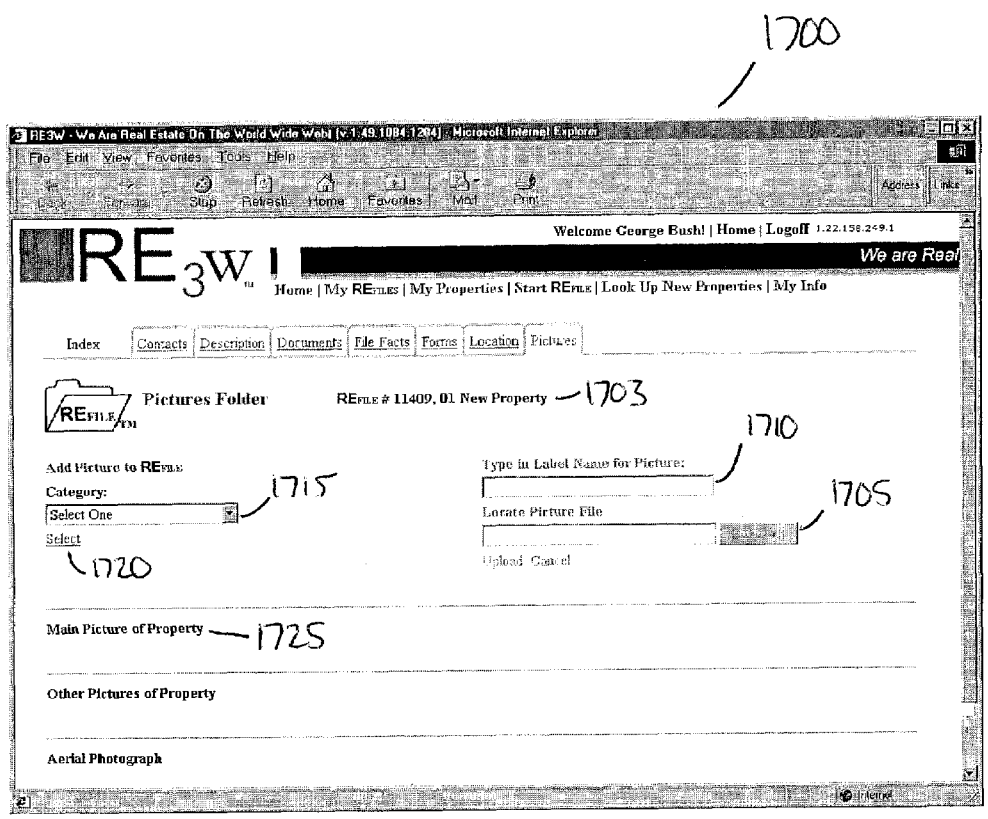
FIG. 17 illustrates a pictures tab for managing certain content within a property file, in accordance with an embodiment of the invention.

FIG. 17 illustrates a pictures tab 1700 for a property file 130 indicated by text 1703 in accordance with an embodiment of the invention.

In one embodiment, the user may browse and select a picture file using button 1705, enter a name into a field 1710, and select a picture category from a list box 1715. The user may select hyperlink 1720 to upload the picture file into the property file 130. In one embodiment, the uploaded documents are displayed under a heading (e.g., heading 1725) corresponding to a document category. Any suitable categories of pictures may be used including but not limited to photographs, aerial photographs, satellite photographs, interior photographs, or the like. In one embodiment, the user may advantageously view the uploaded file by selecting a corresponding view hyperlink or the like.

Figure 18A:
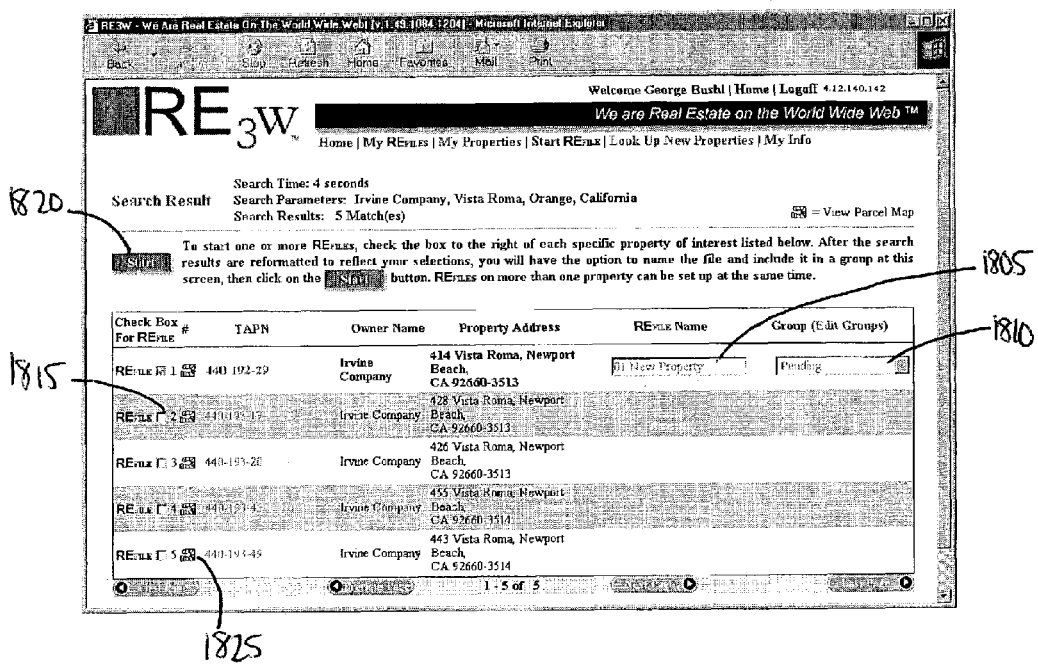
FIG. 18A illustrates a search results screen for displaying properties found as the result of a search, in accordance with an embodiment of the invention.

With reference to FIG. 5, a user may select the hyperlink 535 to open a search window substantially similar to screen 800 (FIG. 8) except the text 805 is not shown. The user may execute a search according to criteria in a manner substantially similar to that shown in FIG. 8 and the corresponding descriptions. In response to the search, the website displays a screen 1800 (FIG. 18A). In one embodiment, the results shown in the screen 1800 preferably indicate that a particular property already has an associated property file; for example, an associated property file name 1805 and an associated group name 1810 indicate that a property file 130 has already been created the first property listed in the results.

As illustrated in FIG. 18A, in one embodiment, the user may select a check box (e.g., check box 1815) and press the start button 1820 to generate a property file having the information corresponding to the parcel associated with check box 815. In one embodiment, the user may select a plurality of such check boxes and press the start button 1820 to create a plurality of property files for the plurality of selected check boxes.

In one embodiment, upon selection of a check box, a screen 1850 (FIG. 18B) is displayed. The user may advantageously enter a name for a property file into a field (e.g., field 1855) and choose an associated property file group from a list box (e.g., list box 1860). Accordingly, upon selection of the start button 1865, a property file is created for the associated check boxes and any given file names and file groups are thus associated with the property files.

Figure 18B:
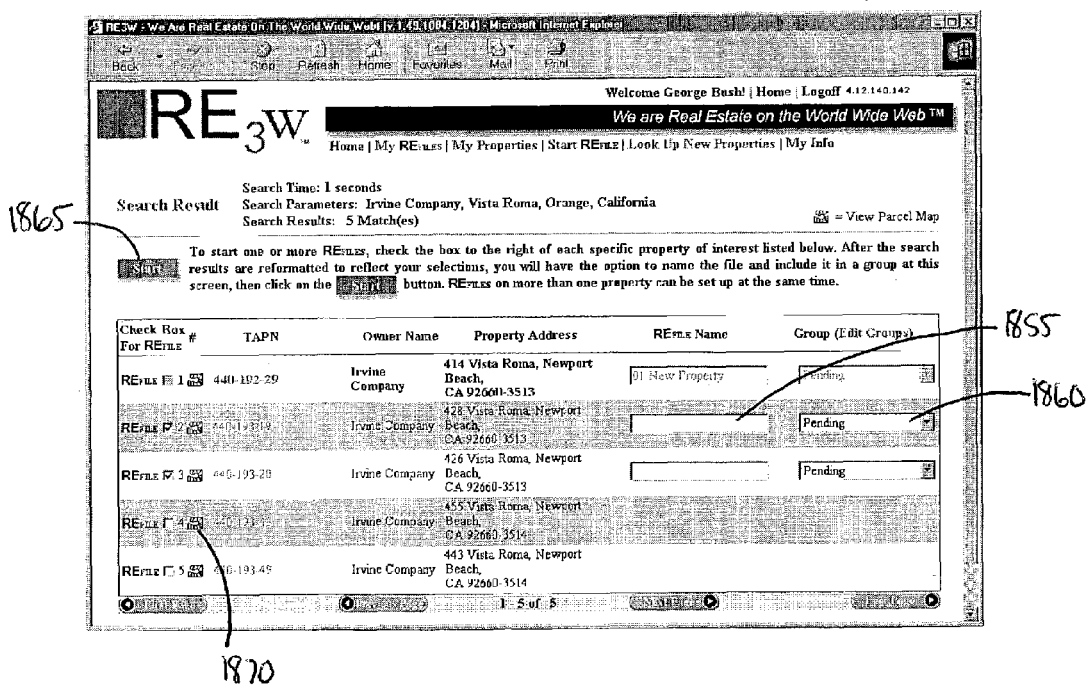
FIG. 18B illustrates a search results screen for displaying properties found as the result of a search, in accordance with an embodiment of the invention.
Figure 19A:
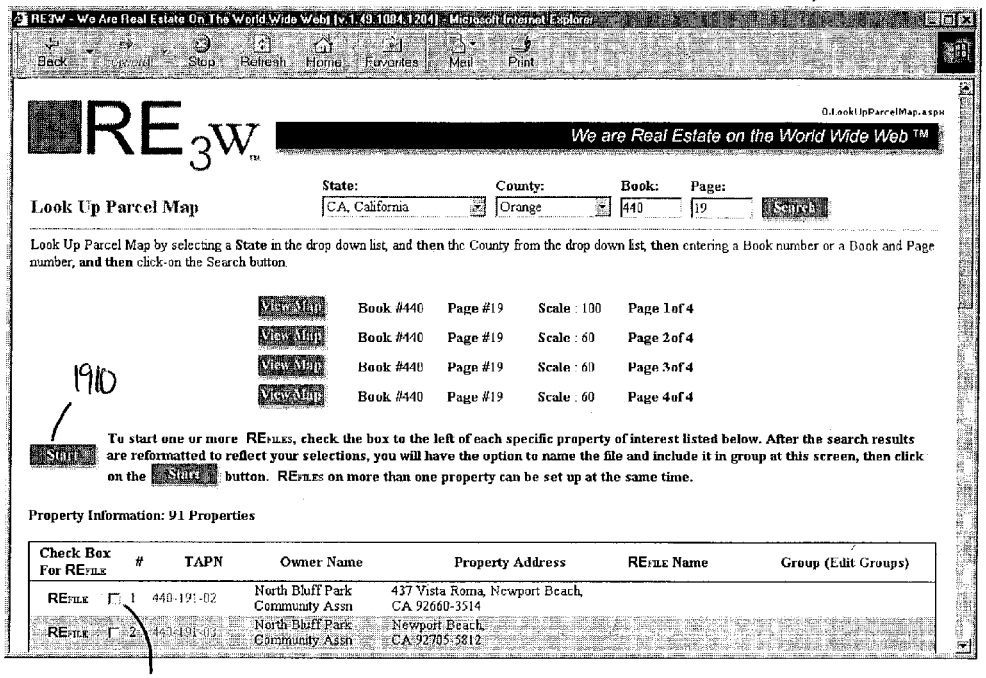
FIG. 19A illustrates a search map screen, in accordance with an embodiment of the invention.

In one embodiment, a user may select a view parcel map button (e.g., the parcel map button 1825 in FIG. 18A or view parcel map button 1870 in FIG. 18B). In response to selecting the view parcel map button, the look up parcel map screen 1900 (FIG. 19A) is displayed. As shown in FIG. 19A, the user may select a check box 1905 that has preferably has substantially similar functionality as check box 1815 (FIG. 18A). Thus, in one embodiment, upon selection of the check box 1905, a field may advantageously appear for entering a property file name and a list box for a group type. In response to the user selecting a start button 1910, a corresponding property file will be created with that corresponding file name and group name. In one embodiment, the user may select a plurality of such check boxes and press the start button 1910 to create a plurality of property files for the plurality of selected check boxes.

Figure 19B:
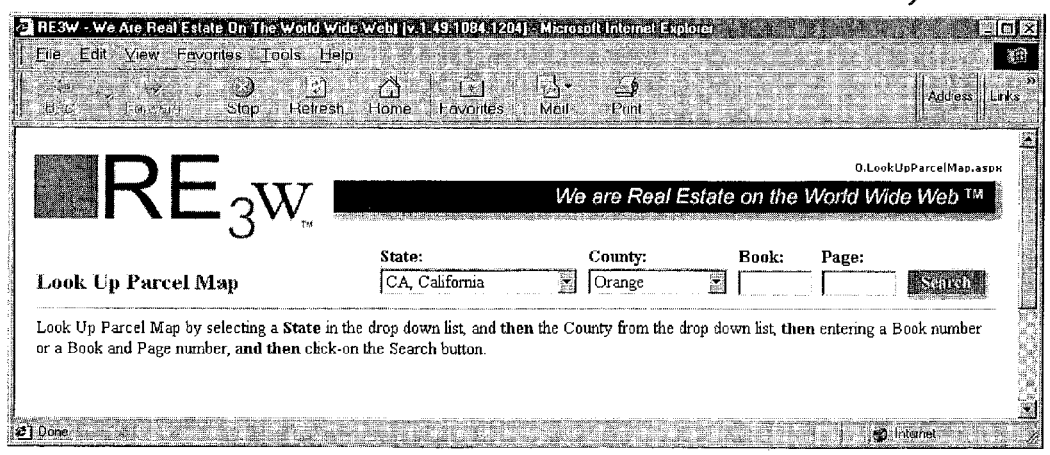
FIG. 19B illustrates a search map screen, in accordance with an embodiment of the invention.

With reference to FIG. 5, a user may select the hyperlink 535 to open a search window substantially similar to screen 800 (FIG. 8) except the text 805 is not shown. In one embodiment, the user would select a proceed button 840 to open a parcel look up screen 1950 (FIG. 19B). Accordingly, as illustrated in FIG. 19B, the user may search the tax authority parcel map or the like on the basis of a state, a county, a book, a page, or any suitable combination thereof. The results of the search are displayed and used in a manner substantially similar to that shown in FIG. 19A. Also, in FIG. 19A, the user may search the tax authority parcel map or the like on the basis of a state, a county, a book, a page, or any suitable combination thereof.

Figure 20A:
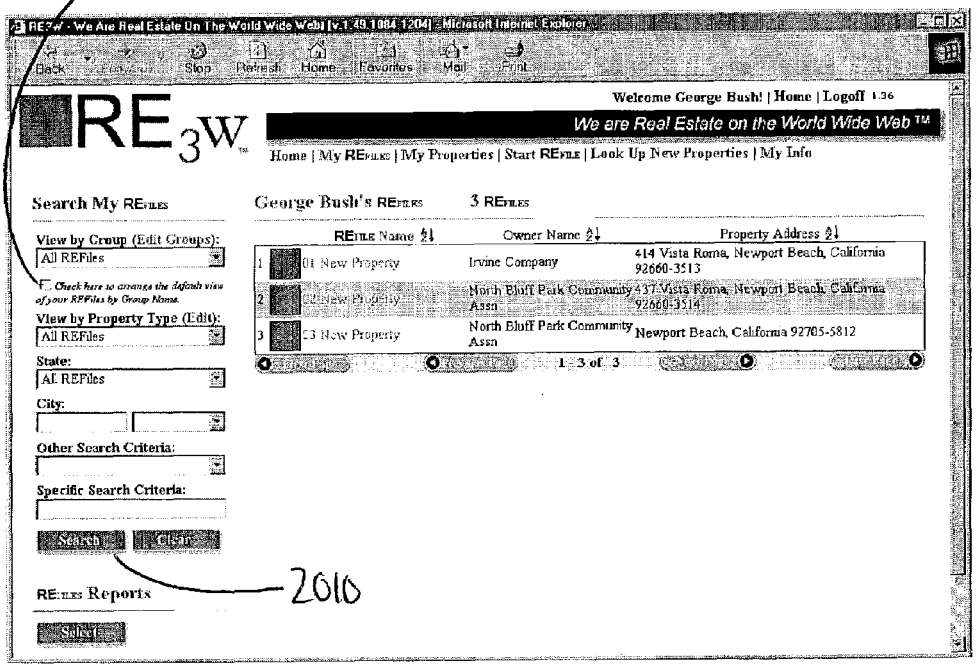
FIG. 20A illustrates a screen for viewing a set of property files, in accordance with an embodiment of the invention.
Figure 20B:
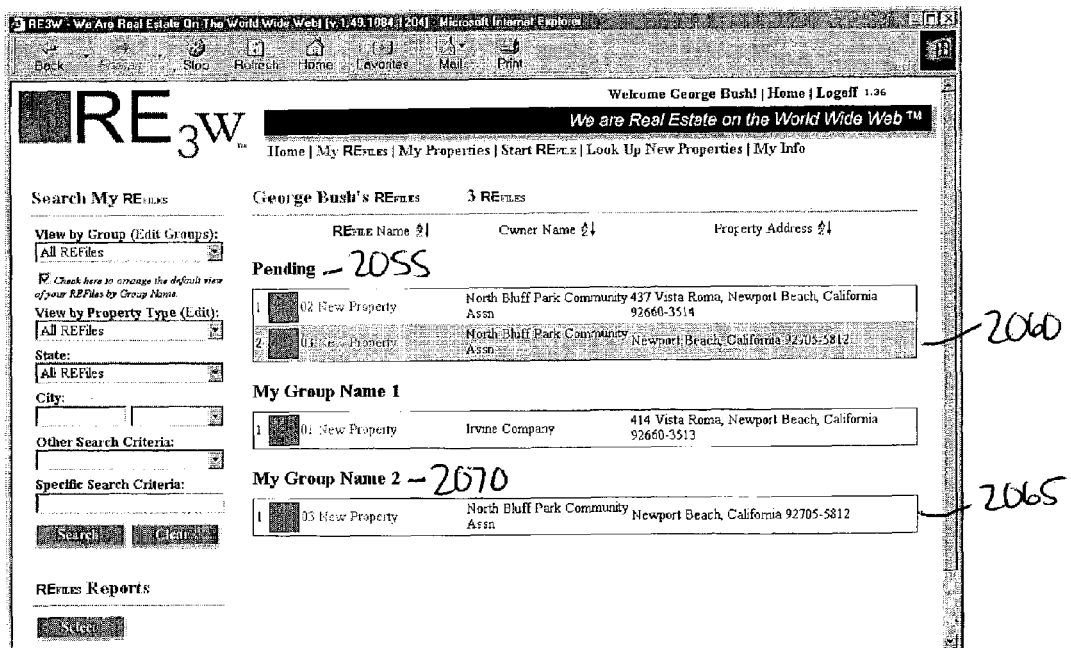
FIG. 20B illustrates a screen for viewing a set of property files, in accordance with an embodiment of the invention.

FIG. 20A illustrates screen 2000, which is an embodiment of screen 500 in which a plurality of property files 130 have been created. In this embodiment, the property files 130 are displayed as a list, as shown in screen 2000. Upon selection of check box 2005 and selecting the search button 2010, a screen 2050 (FIG. 20B) is shown. In the embodiment shown in screen 2050, the property files 130 are displayed according to associated groups under a particular group heading (e.g., group heading 2055). In one embodiment, a property may be within multiple groups. For example, one illustrated property file is in two groups: list entry 2060 and list entry 2065 corresponding respectively to group 2055 and 2070.

Relationship Management

FIG. 21A, FIG. 21B and FIG. 21B illustrate an embodiment of the invention wherein the data management system 120 determines the possession of a set of one or more property files created within a relationship between a member A and a member B. In one embodiment, in a process 2100, at a block 2110, member A and member B enter into a relationship via a data management system 120. The relationship preferably defines the post-relationship access rights to property files that were created within the relationship. In one embodiment, the relationship defines that member A and member B each retain a separate copy of the property files created within the relationship. At a block 2120, a property file 2122 and a property file 2124 are created within the relationship. Accordingly, member A and member B use the property files 2122 and 2124 for any suitable purpose. However, at a block 2130, the member A and member B dissolve the relationship via the data management system 120. At a block 2130, in dissolving the relationship, the data management system 120 preferably automatically processes the post-relationship access rights to property files, as defined in the relationship. Accordingly, at a block 2140, the data management system 120 provides a copy of property files 2122 and 2124 for member A (i.e., property files 2122A and 2124A) and for member B (i.e., property files 2122B and 2124B).

In one embodiment, the relationship advantageously defines post-relationship access rights to property files created outside the relationship. For example only and not to limit the scope of the invention, a member creates one or more property files prior to entering a relationship. When creating the relationship or during the relationship, the member adds the one or more property files to the relationship. Upon dissolution of the relationship, each member retains a separate copy of the one or more property files.

In one embodiment, a member may create a property file during the existence of a relationship, but not within the relationship. Accordingly, during the relationship, the member adds the one or more property files to the relationship. Upon dissolution of the relationship, each member retains a separate copy of the one or more property files.

FIG. 22A, FIG. 22B and FIG. 22B illustrate an embodiment of the invention wherein the data management system 120 determines the possession of a set of one or more property files created within a relationship between a member A and a member B. In one embodiment, in a process 2200, at a block 2210, member A and member B enter into a relationship via a data management system 120. The relationship preferably defines the post-relationship access rights to property files that were created within the relationship. In one embodiment, the relationship defines that only member A will retain a copy of the property files created within the relationship. At a block 2220, a property file 2222 and a property file 2224 are created within the relationship. Accordingly, member A and member B use the property files 2222 and 2224 for any suitable purpose. However, at a block 2230, the member A and member B dissolve the relationship via the data management system 120. At a block 2230, in dissolving the relationship, the data management system 120 preferably automatically processes the post-relationship access rights to property files, as defined in the relationship. Accordingly, at a block 2240, the data management system 120 automatically provides a copy of the property files 2222 and 2224 for member A (i.e., property files 2222A and 2224A) and member B is provided with no copy of the property files 2222 and 2224.

In other embodiments, three or more members enter into a relationship via a data management system 120 in which one, two, or more of the members are granted post-relationship access rights to a copy of property files that were created within the relationship. Any suitable number of members may enter into a relationship. Further, any suitable number of members may be granted post-relationship access rights to a copy of property files that were created within the relationship.

Other preferred embodiments comprising other combinations, omissions, substitutions and modifications to the above-described preferred embodiments may be used, as described below.

In one embodiment, the website 410 advantageously includes one or more features, including a secure environment using encryption or the like, an online customer support system, an accounting/billing system (e.g., processing telephone, mail, and online registration and membership), and an email system.

In one embodiment, the data management system 120 may include an audit module configured to display an audit trail of the access of a property file 130. The audit trail preferably identifies the person (e.g., member, guest, or the like) accessing the property file 130, the time and date of access, the type of access, or any other suitable information. In one embodiment, the audit trial is displayed as an integrated portion of the property file 130 subject to access rights. A person preferably may limit the persons that can view the audit trail and limit the portions of the audit trail that the persons view. Thus, a person may view or supervise the activity of another that is working with a property file 130.

In one embodiment, the data management system 120 may store a history of the data incorporated into a property file 130. The history data may be stored within the database 435, within the database 450, within any suitable computer system, or any suitable combination thereof. Accordingly, as data changes, the data management system 120 allows a person to view the history of changes, which preferably includes the data changed and the data of the change.

In one embodiment, a file content checklist is provided that is preferably expandable by property type. The checklist may advantageously include one or more of the following: a list of participants, a list of documents, and a timeline showing the typical transaction process. The checklist is preferably modifiable and expandable by member for a specific transaction and property type. For example, a transaction for a particular property type may have particular tasks to be carried out by particular participants and documents to be prepared and signed. Accordingly, the checklist would preferably display the status of each task and document, along with any relative order or dependency among the tasks and documents.

In one embodiment, the website 410 includes an interactive developer directory that can advantageously display a set of developers according to one or more suitable criteria, including geographic location and property type. A member preferably may flag one or more of the set of developers to submit one or more properties. The member may submit a property using any suitable method, such as website email or the like. A developer preferably may filter out unwanted submissions according to any suitable criteria, including geographic location, property type, property size, or the like. In one embodiment, a developer may request notification of a property recently listed as "for sale." Notifications may be requested for properties accordingly to any suitable criteria (e.g., property type, property size, price range, location or the like). In one embodiment, the website 410 allows a developer to create a personalized sub-website within the website 410. The displayed set of developers preferably includes links to developers' sub-websites. In one embodiment, a developer bulletin board is provided wherein developers may exchange information. The access to the interactive developer directory is preferably limited to members of the website 410. The access to the developer bulletin board is preferably limited to developer members of the website.

In one embodiment, the website 410 includes an interactive investor directory that can advantageously display a set of investors according to one or more suitable criteria, including geographic location and preferred property type. A member preferably may flag one or more of the set of investors to submit one or more properties. The member may submit a property using any suitable method, such as website email or the like. An investor preferably may filter out unwanted submissions according to any suitable criteria, including geographic location, property type, property size, or the like. In one embodiment, a developer may request notification of a property recently listed as "for sale." Notifications may be requested for properties accordingly to any suitable criteria (e.g., property type, property size, price range, location or the like). In one embodiment, the website 410 allows an investor to create a personalized sub-website within the website 410. In one embodiment, the displayed set of investors includes links to investors' sub-websites. In one embodiment, an investor bulletin board is provided wherein investors may exchange information. The access to the interactive investor directory is preferably limited to members of the website 410. The access to the investor bulletin board is preferably limited to investor members of the website.

In one embodiment, the website 410 includes an interactive municipal/governmental directory that can advantageously display a set of municipalities, governmental entities, or the like according to one or more suitable criteria. The website 410 preferably allows the municipality or governmental entity to create a personalized sub-website within the website 410. The displayed set preferably includes links to the sub-websites. The access to the directory is preferably limited to members of the website 410. In one embodiment, the website 410 includes a directory for the offices and officials of one or more governmental entities (e.g., federal, state, county, city, or the like). The access to the directory for the offices and officials is preferably provided to members of the website 410 and the public.

In one embodiment, the website 410 includes an interactive insurer directory that can advantageously display a set of insurers (e.g., property, casualty, environmental, or the like) according to one or more suitable criteria, including geographic location, coverage type, or the like. A member preferably may flag one or more of the set of insurers to solicit offers. The member may solicit using any suitable method, such as website email or the like. An insurer preferably may filter out unwanted solicitations according to any suitable criteria, including geographic location, property type, or the like. In one embodiment, the website 410 allows an insurer to create a personalized sub-website within the website 410. The displayed set of insurers preferably includes links to insurers' sub-websites. The access to the interactive insurer directory is preferably limited to members of the website 410.

In one embodiment, the website 410 includes an interactive lender/equity-investor directory that can advantageously display a set of lenders, equity investors, or the like according to one or more suitable criteria, including geographic location and preferred property type. A member preferably may flag one or more of the displayed set of lenders/equity-investors to submit one or more properties to solicit loans, equity, or both. The member may submit a property using any suitable method, such as website email or the like. A lender/equity-investor preferably may filter out unwanted submissions according to any suitable criteria, including geographic location, property type, loan amount, or the like. In one embodiment, the website 410 allows a lender/equity-investor to create a personalized sub-website within the website 410. The displayed set of lenders/equity-investors preferably includes links to the sub-websites of the lenders/equity-investors. In one embodiment, a lender bulletin board is provided wherein lenders or the like may exchange information. In one embodiment, an equity-investor bulletin board is provided wherein equity-investors or the like may exchange information. The access to the interactive lender/equity-investor directory is preferably limited to members of the website 410. The access to the lender bulletin board is preferably limited to lender members of the website. The access to the equity-investor bulletin board is preferably limited to equity-investor members of the website. In one embodiment, the website 410 provides title insurance products, lender support products, or the like.

In one embodiment, the website 410 includes an interactive tenant directory that can advantageously display a set of tenants according to one or more suitable criteria, including geographic location, tenant industry, tenant size, or the like. A member preferably may flag one or more of the set of tenants to submit one or more properties. The member may submit a property using any suitable method, such as website email or the like. A tenant preferably may filter out unwanted submissions according to any suitable criteria, including geographic location, property size, property type, or the like. In one embodiment, a tenant may request notification of a property recently listed as "for sale." Notifications may be requested for properties accordingly to any suitable criteria (e.g., size of space, space layout, rent, landlord, location, parking, or the like). In one embodiment, the website 410 allows an tenant to create a personalized sub-website within the website 410. The displayed set of tenants preferably includes links to tenants'sub-websites. In one embodiment, an tenant bulletin board is provided wherein tenants may exchange information. The access to the interactive tenant directory is preferably limited to members of the website 410. The access to the tenant bulletin board is preferably limited to tenant members of the website.

In one embodiment, the website 410 facilitates negotiation among a plurality of members, including developers, investors, sellers, legal counsel, service providers. The website displays documents to the members, which can advantageously negotiate and then revise the content of the documents from remote locations. Standardized documents are preferably provided with selectable, alternative provisions. Accordingly, when the members agree upon an alternative, the alternative provision is selected via the website and the document then reflects the selection. In one embodiment, the website 410 includes voice communication, video communication, or both to allow the plurality of members to negotiate via the website.

In one embodiment, the website 410 facilitates negotiation among a plurality of members, including developers, investors, legal counsel, lenders, equity investors, or the like. The website displays documents to the members, which can advantageously negotiate and then revise the content of the documents from remote locations. Standardized documents are preferably provided with selectable, alternative provisions. Accordingly, when the members agree upon an alternative, the alternative provision is selected via the website and the document then reflects the selection. In one embodiment, the website 410 includes voice communication, video communication, or both to allow the plurality of members to negotiate via the website.

In one embodiment, the website 410 facilitates negotiation among a plurality of members, including tenants, developers, investors, legal counsel, service providers, or the like. The website displays documents to the members, which can advantageously negotiate and then revise the content of the documents from remote locations. Standardized documents are preferably provided with selectable, alternative provisions. Accordingly, when the members agree upon an alternative, the alternative provision is selected via the website and the document then reflects the selection. In one embodiment, the website 410 includes voice communication, video communication, or both to allow the plurality of members to negotiate via the website.

In one embodiment, the website 410 associates a public property number with a property file. A member uses the website to advantageously grant certain access rights for viewing some or all of the information in the property file. For example, the access rights may be granted to the public (e.g., anyone knowing the associated property number of the property file). In one embodiment, the website 410 displays the information in response to receiving the property number via any suitable method, such as via a hyperlink posted on the member's website, via a textbox on the website 410, or the like. Accordingly, a member may advantageously advertise the public property number on the member's website along with hyperlinks to the website 410. In one embodiment, the website 410 associates a member property number to allow a member to access information in a manner substantially similar to that used with a public property number. In one embodiment, a first member, using a member property number associated with a property file 130 of a second member, accesses information associated with the property file 130 and uses that information to create a new property file 130.

In one embodiment, the website 410 displays zoning maps (e.g., city, county, or the like) and zoning descriptions, which may advantageously be viewed or printed by one or more members or by the public. In one embodiment, the website 410 uses information in a property file 130 to determine an associated zoning map and associated zoning description and, in response to a member request, to add the zoning map and zoning description to the property file 130. In one embodiment, the website 410 may similarly display redevelopment-related documents (e.g., site maps, programs, developer qualifications, submission procedures, or the like).

In one embodiment, the website 410 includes a library of oblique aerial photographs. In one embodiment, the library includes photographs of major metropolitan areas. The access to the library of oblique aerial photographs is preferably limited to members of the website 410, to the public, or both.

In one embodiment, the website 410 includes a directory of industry websites for viewing by members of the website 410, the public, or both. In one embodiment, the website 410 includes a database of member-entered compensation information (e.g., concerning positions the members have filled) for viewing by members of the website 410, the public, or both. In one embodiment, the website 410 includes a database of job openings (and employer-related hyperlinks) for viewing by members of the website 410, the public, or both. In one embodiment, the website 410 includes a database of market studies, research reports, technical bulletins, or the like (and author-related hyperlinks) for viewing by members of the website 410, the public, or both. In one embodiment, the website 410 includes a database of sales comparables, lease comparables, or the like for viewing by members of the website 410, the public, or both; The sales/lease comparables database preferably includes data derived from formal transaction documents (e.g., documents generated by the website 410, documents not generated by the website, or both).

In one embodiment, the website 410 provides descriptions of ownership regulations, methods for vesting (e.g., trust deed, warranty deed), or the like for one or more governmental entities.

In one embodiment, the website 410 provides reports (e.g., summary, presentation) using information from one or more property files 130. The reports may advantageously customize the reports to present content from a member's property files 130.

In one embodiment, the website 410 uses information from a property file 130 to generate a proposal to purchase the property associated with the property file. In one embodiment, the purchase proposals may be formatted according to a predetermined property type. In one embodiment, the website 410 uses information from a property file 130 to generate purchase offer documents. In one embodiment, the website 410 uses information from a property file 130 to generate formal documents such as purchase and sales agreements, joint escrow instructions, ground lease documents, deeds, affadavits, bills of sale, or the like. The purchase proposals and formal documents are preferably customized according to property type and according to the laws or regulations of one or more governmental entities associated with a property, such as states or the like.

In another emobodiment, the website 410 includes a financial acquisition module. The financial acquisition module preferably accesses information in one or more property files to perform any suitable acquisition-related analysis, such as cash flow, investment evaluation, or the like.

In one embodiment, the website 410 generates reports (e.g., summary reports, presentations) using any suitable combination of one or more member's property files, one or more views, or the like.

In one embodiment, the website 410 uses information from a property file 130 to generate financing documents and exhibits from one or more templates. Financing documents preferably include one or more of promissory notes, deeds of trust, mortgages, peripheral documents (e.g., environmental indemnities, guarantees), or the like. In one embodiment, the documents and exhibits are customized according to a property type.

In one embodiment, the website 410 generates a presentation report concerning properties in selected for-lease listings. In one embodiment, the website 410 displays a comparison grid to compare a plurality of for-lease listings that were submitted directly, indirectly or both.

In one embodiment, the website 410 uses information from a property file 130 to generate a tenant's proposal to lease the property associated with the property file. In one embodiment, the lease proposals may be formatted according to a predetermined property type and may advantageously be submitted to one or more lessors. In one embodiment, the website 410 uses information from a property file 130 to generate lease proposal documents from a tenant. In one embodiment, the website 410 uses information from a property file 130 to generate formal documents such lease agreements, exhibits, or the like. The lease proposals and formal documents are preferably customized according to property type and according to the laws or regulations of one or more governmental entities associated with a property, such as states or the like.

In one embodiment, the website 410 provides property-specific and vicinity maps. Accordingly, a user may plot the location of a property on the map in lieu of or in addition to using searches described herein.

In one embodiment, the website 410 uses information in the property file 130 to provide loan securitization and sale to an investor, agency, or the like.

In one embodiment, the website 410 includes an auction module configured to receive bids and dispose of properties from for-lease listings, for-sales listings, or the like.

In one embodiment, two or more members each possess a property file 130 corresponding to the same parcel of property. The website 410 preferably allows the two or more members to merge the content from each property file into a single property file.

Although the website 410 is disclosed with reference to its preferred embodiment, the invention is not intended to be limited thereby. Rather, a skilled artisan will recognize from the disclosure herein a wide number of alternatives for the website.

Although the foregoing invention has been described in terms of certain preferred embodiments, other embodiments will be apparent to those of ordinary skill in the art from the disclosure herein. For example, although certain embodiments are disclosed with reference to a website, any suitable computer system may be used, including ones not accessible via the Internet. Further, although certain embodiments are disclosed with reference to the commercial real estate context, these embodiments may also be used in the residential real estate context and in any suitable non-real estate context. For example, although certain embodiments are described with reference to property files, some embodiments may be used with files of other content, structure, or the like. Also, although some embodiments are described with reference to a tax authority parcel number and a tax authority parcel map, any suitable parcel map and parcel identification may be used, including without limitation a map displaying parcels of property and having a corresponding parcel identification (e.g., number, code, numbering system, coding system, or the like) that preferably identifies the displayed parcels.

Additionally, other combinations, omissions, substitutions and modifications will be apparent to the skilled artisan in view of the disclosure herein. Accordingly, the present invention is not intended to be limited by the reaction of the preferred embodiments, but is to be defined by reference to the appended claims.

For purposes of construing the claims, a method claim that recites multiple steps should not be construed as necessarily requiring that these steps be performed in the order in which they are recited.

Additionally, all publications, patents, and patent applications mentioned in this specification are herein incorporated by reference to the same extent as if each individual publication, patent, or patent application was specifically and individually indicated to be incorporated by reference.

What is claimed is:

1. A computer-implemented method for facilitating generation of a property file, comprising:

receiving from a user an indication of a plurality of streets;

searching at least one database that associates parcel maps with properties shown on the parcel maps, the properties being in the vicinity of the plurality of streets, and the database further associates properties with street addresses to identify a set of parcel maps in which the properties shown have addresses corresponding to at least two of the streets indicated by the user;

displaying the set of identified parcel maps to the user;

receiving a user selection of at least one of the identified parcel maps;

displaying the selected parcel map along with parcel IDs of parcels on the parcel map to facilitate identification a parcel of property;

receiving a user selection of a parcel ID;

creating a property file for the parcel of property identified by the selected parcel ID, wherein at least some data about the parcel of property is retrieved from a property database and stored in the property file; and making the property file accessible to the user.

2. The method of claim 1, further comprising storing contact information in the property file.

3. The method of claim 1, further comprising:

receiving a user selection of one or more entities involved in a real estate transaction related to the property that are to have access to the property file; and making the property file accessible to the selected entities.

4. The method of claim 3, further comprising making the property file inaccessible to an entity that formerly had access in response to receiving a user command to revoke the entity's access.

5. The method of claim 3, further comprising replacing a first entity that formerly had access to the property file with a second entity that did not formerly have access to the property file such that the property file becomes inaccessible to the first entity and accessible to the second entity.

6. The method of claim 5, wherein the first entity is a first broker formerly chosen to have a role in the transaction and the second entity is a second broker chosen to take over the role of the first broker.

7. The method of claim 3, wherein making the property file accessible to the selected entities comprises allowing at least one of the selected entities to modify the property file.

* * * * *

UNITED STATES PATENT AND TRADEMARK OFFICE
CERTIFICATE OF CORRECTION

PATENT NO. : 7,389,242 B2
APPLICATION NO. : 10/430829
DATED : June 17, 2008
INVENTOR(S) : Richard N. Frost It is certified that error appears in the above-identified patent and that said Letters Patent is hereby corrected as shown below:

On the Title Page, Item (56) Page 2, Line 1, (Other Publications) Delete "PI/SQL" and insert --PL/SQL--, therefor.

Column 7, Line 28, Delete "subaccount" and insert --sub-account--, therefor.

Column 7, Line 50, Delete "subaccount" and insert --sub-account--, therefor.

Column 34, Line 52, In Claim 1, after "identification" insert --of--.

Signed and Sealed this

Seventeenth Day of February, 2009

JOHN DOLL
*Acting Director of the United States Patent and Trademark Office*